United States Patent
Konishi et al.

(10) Patent No.: US 6,577,568 B1
(45) Date of Patent: Jun. 10, 2003

(54) OPTICAL DISK APPARATUS USING TILT AND ABERRATION CORRECTION CONTROL SYSTEM

(75) Inventors: Shinichi Konishi, Nara (JP); Takeshi Nakajima, Nara (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 0 days.

(21) Appl. No.: 09/537,869

(22) Filed: Mar. 29, 2000

(30) Foreign Application Priority Data

Mar. 30, 1999 (JP) ............................................ 11-088936

(51) Int. Cl.⁷ ................................................ G11B 7/00
(52) U.S. Cl. .................................................. 369/44.32
(58) Field of Search ........................ 369/44.32, 53.19, 369/53.28, 112.02

(56) References Cited

U.S. PATENT DOCUMENTS

| | | | |
|---|---|---|---|
| 5,719,847 A | * 2/1998 | Tateishi et al. | 369/53.19 |
| 5,805,543 A | 9/1998 | Takamine et al. | 369/44.32 |
| 5,886,496 A | * 3/1999 | Furukawa et al. | 369/53.19 |
| 5,886,962 A | 3/1999 | Takamine et al. | 369/44.32 |
| 5,909,413 A | * 6/1999 | Araki | 369/44.32 |
| 6,246,648 B1 | * 6/2001 | Kuribayashi | 369/44.32 |

FOREIGN PATENT DOCUMENTS

| | | |
|---|---|---|
| JP | 61-51930 | 3/1986 |
| JP | 5-174406 | 7/1993 |
| JP | 8-115528 | 5/1996 |
| JP | 8-293126 | 11/1996 |

* cited by examiner

Primary Examiner—William Korzuch
Assistant Examiner—Kimlien Le
(74) Attorney, Agent, or Firm—Wenderoth, Lind & Ponack, L.L.P.

(57) ABSTRACT

A tilt control apparatus includes an orthogonal shift detector (9) which detects an orthogonal shift by comparing a pair of a plurality of tap coefficients ($C_1, \ldots, C_7$) of a FIR filter and generates an orthogonal shift signal, and an actuator varies the inclination of the optical axis of the light beam to correct the orthogonal shift, and a tilt controller (10) controls the drive of the actuator in accordance with the orhogonal shift signal to minimize the orthogonal shift. In the information recording operation, the orthogonal shift obtained based on a recording track is previously stored in a temporary storage portion and the stored orthogonal shift is used to conduct the tilt control.

7 Claims, 16 Drawing Sheets

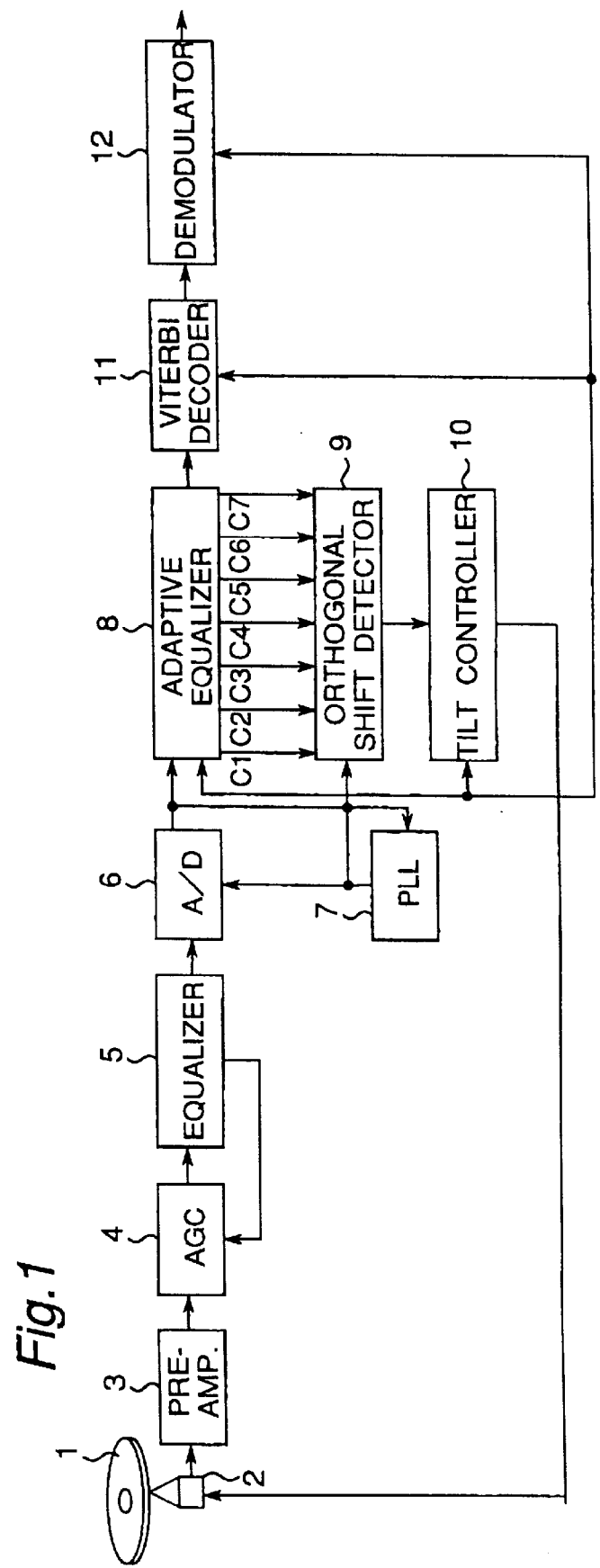

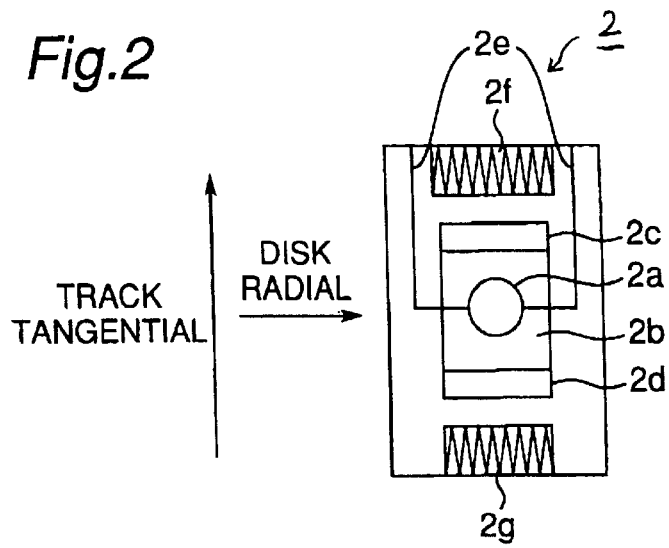
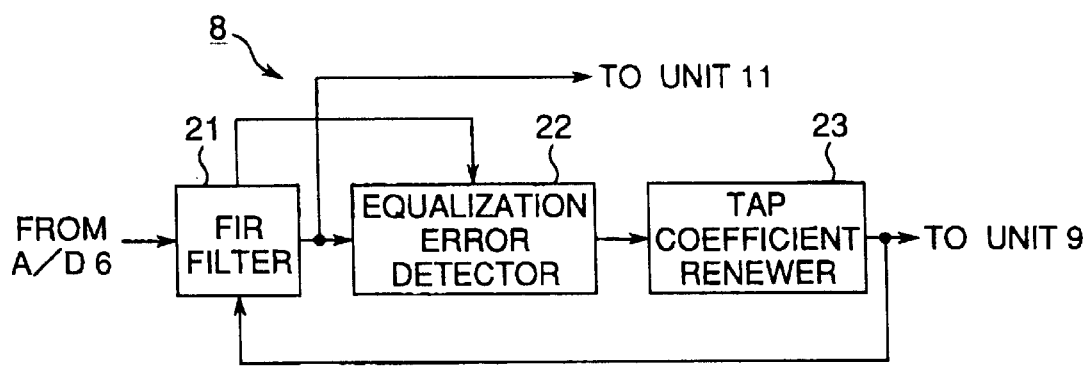

Minus Direction

Plus Direction

TILT = 0

OPTICAL DISK APPARATUS USING TILT AND ABERRATION CORRECTION CONTROL SYSTEM

BACKGROUND OF THE INVENTION

1. Field of the Invention

The present invention generally relates to an optical disk apparatus for recording and/or reproducing information to and/or from an optical disk, and in particular to an optical disk apparatus having an aberration or tilt correction control system for maintaining an orthogonal relationship between an optical axis of a light beam projected by an optical pickup device and an information recording surface of the optical disk.

2. Description of the Prior Art

High speed random access is possible with disc-shaped recording medium, and a high recording density can be achieved by formatting a disk with a narrow data track pitch and pit pitch.

Optical disks such as a DVD, which is typical, have been widely used in recent years as a large capacity recording medium because of a high recording density. Further advances in recording density have also been achieved to further increase storage capacity. Optical disks, however, are typically made from low rigidity materials such as polycarbonate, and even disk deflection or deformation due to warp or bending caused by the dead weight of the disk per se cannot be ignored.

In the case where original data recorded on, for example, an optical disk medium is reproduced by means of an optical pickup device, if an optical axis of an object lens of the pickup device is not perpendicular to the surface of the disk but inclined at some angle with respect to the orthogonal relationship to the surface of the disk, the beam spot projected onto the disk surface is distorted due to the aberration thereof, and there may undesirably cause a distortion in a waveform of the reproduced signal output of the optical pickup device. It is noted here that the inclination error with respect to the orthogonal relationship is referred to as "orthogonal shift" or "tilt", hereinafter.

Moreover, due to the aberration distortion caused in the beam spot, the reflection light beams reflected from adjacent recording pits formed on the disk undesirably interfere with each other. Thus, the modulation degree of the reproduction signal is deteriorated, and there may be caused a shift error in a peak time (referred to as "peak shift" hereinafter) of the reproduction signal, resulting in occurrence of a discrimination error of the information reproduction (RF) signal to be a problem.

As a method of removing distortion components included in the reproduction signal waveform, there has been conventionally used an adaptive equalizer utilizing a finite impulse response filter (referred to as "FIR filter", hereinafter). In this method, an adaptive equalization is recently carried out in a digital data processing system by previously quantizing the reproduced signal using an A/D converter.

Particularly in recent years, however, the data recording density on the recording medium has been remarkably increased and distortion of the reproduction signal due to inter-code interference of the recorded data on the medium is increased, and also a noise influence in a data transmission path can not be ignored because of reduction in amplitude of the reproduction signal. Also, the reproduction signal is sensibly deteriorated by a slight tilt of the disk or a defocus condition in the playback system.

Specifically, in the case of using an optical disk such as DVD-RAM for compatibly recording and reproducing information, such a tilt and defocus condition badly affect both the recording and reproducing operations. Therefore, the aberration correction must be performed with a further higher accuracy. In this situation, as a method of removing the aberration distortion components included in the reproduction signal waveform, a tilt control or aberration correction control method is effective for maintaining an orthogonal relationship between the optical disk surface and the optical axis of the optical pickup device.

A conventional tilt control apparatus is suggested, for example, in the Japanese Laid-Open Patent Publication No. Tokkai-Sho 61-51630, which discloses that the tilt control apparatus detects an error in the orthogonal relationship between a disk surface and an optical axis of a light beam irradiated onto the disk by using tilt photo-sensors, thereby maintaining the orthogonal relationship based on the orthogonal error signal detected by the photo-sensors.

However, this conventional tilt control apparatus has following problems. Specifically, since a pair of photo-sensors are disposed on the right and left sides of the object lens of the optical pickup device, and the apparatus is made large in size and complicated in construction. Moreover, if the characteristics of the photo-sensors are varied in time lapse, an offset is generated to cause an error in the orthogonal relationship. Therefore, a normal orthogonal relationship cannot be maintained even if the orthogonal error is set to zero. Also, a tilt control cannot be performed in a circumferential direction (i.e., track tangential direction) of the disk.

In order to solve these problems, another conventional tilt control system is suggested, for example, in the Japanese Laid-Open Patent Publication No. Tokkai-Hei 5-174406, which discloses that the orthogonal shit error in the circumferential (track tangential) direction included in the reproduction signal is detected and corrected based on the shift in the peak time (i.e., peak shift) of the reproduction signal during the operation of reproducing the information from the disk in a pulse phase modulation (PPM) system.

However, in recent optical disk apparatuses, the information is mainly recorded on the disk in a pulse width modulation (PWM) system in order to obtain a higher recording density. Therefore, there has been a problem that the above conventional tilt control system adapted to the PPM recording system can not be utilized in the data reproduction system adapted to the PWM recording system. Moreover, there has been a problem that a tilt correction control in the circumferential (.e., track tangential) direction of the disk can not be performed during the data recording operation.

SUMMARY OF THE INVENTION

The present invention has been developed to solve these problems and has an object to provide an aberration correction control apparatus or tilt control apparatus, which can be utilized in the data reproduction system adapted to the PWM recording system, and also the tilt correction control in the circumferential (.e., track tangential) direction of the disk can be performed during the data recording operation as well as during the data reproducing operation.

Another object of the present invention is to provide an optical disk apparatus using the improvement of the aberration correction control apparatus or tilt control apparatus.

In order to achieve the objects mentioned above, a first aspect of the present invention provides a tilt control apparatus for controlling to minimize an error of an orthogonal shift in an orthogonal relationship between an optical disk surface and an optical axis of a light beam irradiated from an optical pickup onto the optical disk in combination with an adaptive equalizer adaptively renewing a plurality of tap coefficients of a FIR filter in an optical disk apparatus. The tilt control apparatus comprisses: an orthogonal shift detector for detecting the orthogonal shift of the light beam using the tap coefficients of the adaptive equalizer and generating an orthogonal shift signal in accordance with the detected orthogonal shift; an inclination drive unit for varying the inclination of the optical axis of the light beam to correct the orthogonal shift; and a drive control unit for controlling the inclination drive of the inclination drive unit in accordance with the orhogonal shift signal to minimize the orthogonal shift of the light beam.

The orthogonal shift detector detects the orthogonal shift by comparing at least one pair of the tap coefficients symmetrical with respect to a center position in time delay order thereof.

The number of the plurality of the tap coefficients is odd in time delay order, and the drive control unit controls the inclination drive of the inclination drive unit in a manner that at least a pair of the symmetrical tap coefficients are substantially made coincident with each other.

A second aspect of the present invetion provides an optical disk apparatus for recording and reproducing information to and from an optical disk, which comprises: an optical pickup irradiating a light beam onto an optical disk surface for recording and reproducing the information to generate an analogue reproduction signal therefrom; an A/D converter for converting the analogue reproduction signal into a digital form; an adaptive equalizer receiving the digital reproduction signal from the A/D converter and adaptively renewing a plurality of tap coefficients of a FIR filter; and a tilt control apparatus for controlling to minimize an error of an orthogonal shift in an orthogonal relationship between an optical disk surface and an optical axis of a light beam irradiated from the optical pickup onto the optical disk, wherein the tilt control apparatus comprises: an orthogonal shift detector for detecting the orthogonal shift of the light beam using the tap coefficients of the adaptive equalizer and generating an orthogonal shift signal in accordance with the detected orthogonal shift; an inclination drive unit for varying the inclination of the optical axis of the light beam to correct the orthogonal shift; and a drive control unit for controlling the inclination drive of the inclination drive unit in accordance with the orhogonal shift signal to minimize the orthogonal shift of the light beam.

Thus, in the information recording operation, the orthogonal shift obtained based on a recording track is previously stored in a temporary storage portion and the stored orthogonal shift is used to conduct the tilt control. Thus, the tilt control apparatus can be utilized in the data reproduction system adapted to the PWM recording system, and also the tilt control in the circumferential direction of the disk can be performed during the data recording operation as well as during the data reproducing operation.

A third aspect of the present invention provides an aberration control apparatus for controlling to minimize an aberration contained in a spot of a light beam irradiated from an optical pickup onto the optical disk in combination with an adaptive equalizer adaptively renewing a plurality of tap coefficients of a FIR filter in an optical disk apparatus. The aberration correction control apparatus comprises: an aberration detector for detecting the aberration of the light beam spot using the tap coefficients of the adaptive equalizer and generating an aberration detection signal in accordance with the detected aberration; an aberration correcting unit for correcting the aberration of the light beam spot; and a correction control unit for controlling the aberration correction of the aberration correcting unit in accordance with the aberration detection signal to minimize the aberration of the light beam spot.

The aberration detector detects the aberration by comparing at least one pair of the tap coefficients symmetrical with respect to a center position in time delay order thereof.

The number of the plurality of the tap coefficients is odd in time delay order, and the correction control unit controls the the aberration correction of the aberration correcting unit in a manner that at least a pair of the symmetrical tap coefficients are substantially made coincident with each other.

The aberration correcting unit is segmented into a plurality of liquid crystal tilt correction elements, each of the liquid crystal elements having an independently variable light refractive index, and the aberration correction control is executed by varying the light refractive indexes of the liquid crystal elements individually.

A fourth aspect of the present invention provides an optical disk apparatus for recording and reproducing information to and from an optical disk, which comprises: an optical pickup irradiating a light beam onto an optical disk surface for recording and reproducing the information to generate an analogue reproduction signal therefrom; an A/D converter for converting the analogue reproduction signal into a digital form; an adaptive equalizer receiving the digital reproduction signal from the A/D converter and adaptively renewing a plurality of tap coefficients of a FIR filter; and an aberration control apparatus for controlling to minimize an aberration contained in a spot of a light beam irradiated from the optical pickup onto the optical disk, wherein the aberration control apparatus comprises: an aberration detector for detecting the aberration of the light beam spot using the tap coefficients of the adaptive equalizer and generating an aberration detection signal in accordance with the detected aberration; an aberration correcting unit for correcting the aberration of the light beam spot; and a correction control unit for controlling the aberration correction of the aberration correcting unit in accordance with the aberration detection signal to minimize the aberration of the light beam spot.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 1 is a block diagram of an optical disk apparatus according to a first embodiment of the present invention;

FIG. 2 is a schematic plan view showing a construction of an optical pickup device according to the first embodiment;

FIG. 3 is a conceptual block diagram showing a construction of an adaptive equalizer;

DETAILED DESCRIPTION OF THE PREFERRED EMBODIMENTS

Figure 4:
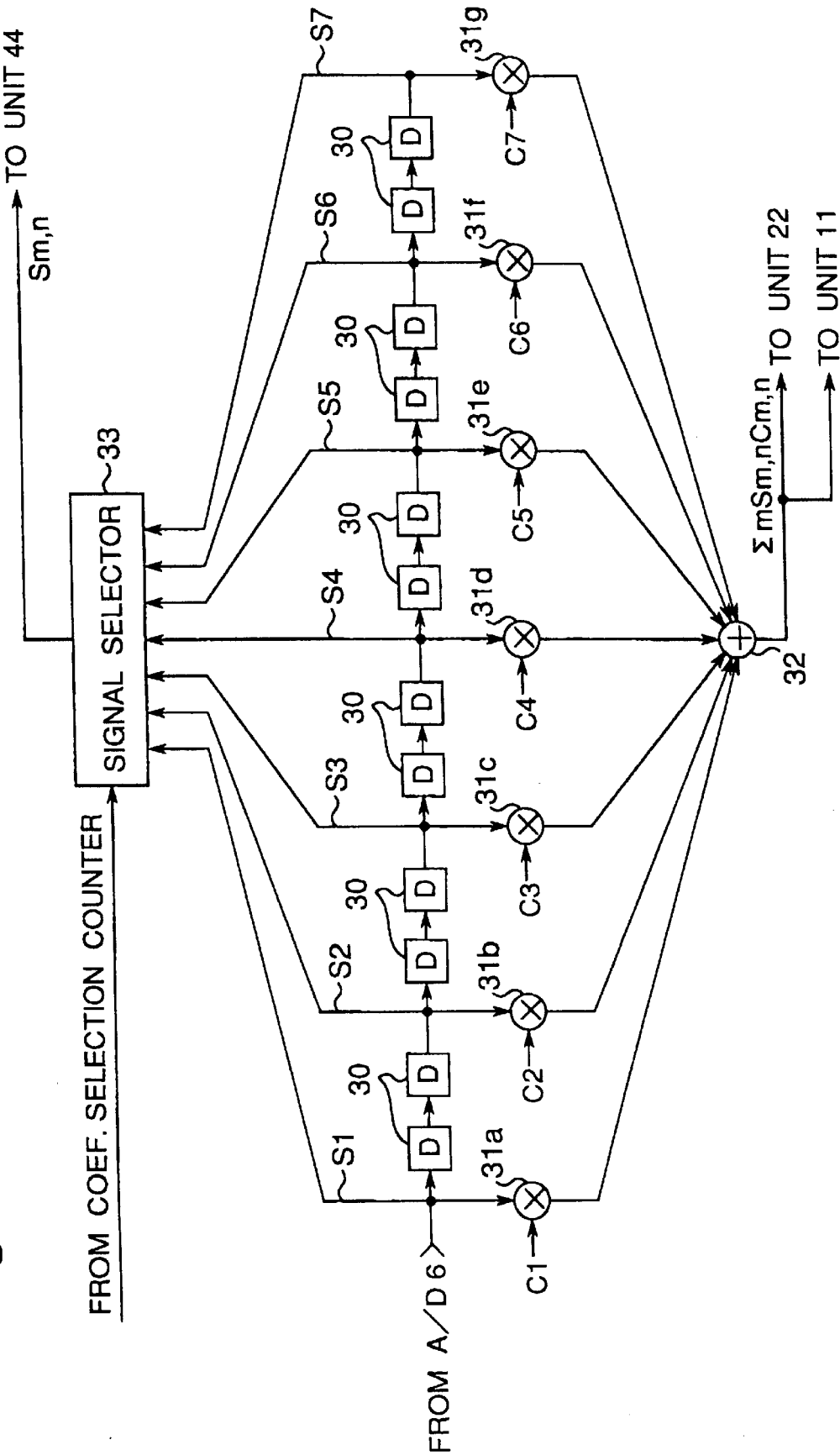
FIG. 4 is a block diagram showing a construction of a FIR equalizing filter.

Before the description proceeds, it is to be noted that, since the basic structures of the preferred embodiments are in common, like parts are designated by the same reference numerals throughout the accompanying drawings.

Figure 19:
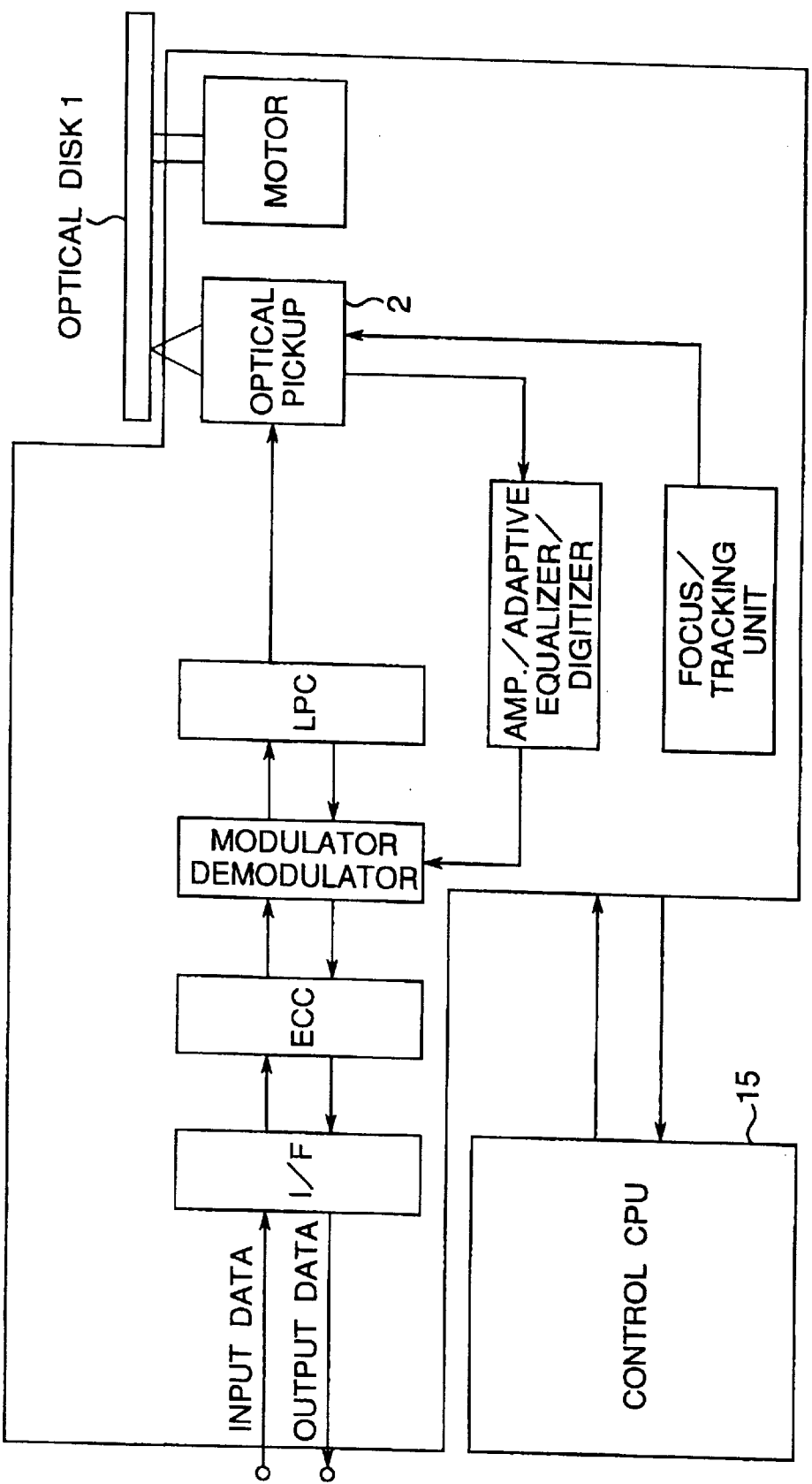
FIG. 19 is a block diagram for explaining a data recording and reproducing operation of an optical disk apparatus according to the present invention.

Firstly, the following briefly describes an example of a configuration and concept of a recording and reproducing operation of an optical disk apparatus according to the present invention with reference to FIG. 19.

As shown in FIG. 19, the optical disk apparatus includes an optical disk 1, disc motor, optical pickup device 2, laser drive circuit (LPC), modulator/demodulator, error detector and corrector (ECC), interface unit, amplifier/adaptive equalizer/digitizer, focus tracking controller, and control CPU 15. The disc motor rotates the optical disk 1, and the optical pickup device 2 comprises an optical lens, actuator and semiconductor laser to thereby read and write data to and from the optical disk. The laser drive circuit (LPC) drives the laser of the optical pickup device 2.

During the recording operation, the modulator/demodulator digitally modulates the data to a form suitable for recording, and demodulates the data during the reproduction operation. The error detector and corrector (ECC) executes error detection and correction. The interface unit (I/F) controls interfacing with a host computer through an external input and output terminals. The amplifier/adaptive equalizer/digitizer amplifies the reproduction signal and adaptively equalizes the amplified data and digitizes the resultant amplified reproduction signal. The focus tracking controller tracks the optical pickup device to a target track, and focuses the laser beams on the recording surface of the optical disk.

The control CPU is a controller providing overall control of the optical disk apparatus, that is, executing target address extraction for determining a target sector address for reading or writing, reproduction control, adaptive equalizing control, tilt aberration control, command control such operations as command analysis, recording control, and the like. The control CPU is preferably a microprocessor whereby the functions of the component units thereof can be accomplished in software.

The data recording operation by the optical disk apparatus thus constructed is described briefly below.

User data sent from a host computer via the external terminal is inputted via the interface unit (I/F) and error detector and corrector (ECC) and is supplied to the modulator/demodulator. The modulator/demodulator digitally modulates the error correction coded data. In the meanwhile, the control CPU designates a target track to the focus tracking controller. The focus tracking controller moves the optical pickup device to the target track to record the input user data. The digitally modulated modulation data is sent to the laser drive circuit (LPC), which modulates the laser power according to the modulation data, and records the data to the data recording area of the target sector on the optical disk.

The operation for reproducing data is described briefly next. When data is reproduced, the control CPU sends the target track for data reproduction to the focus tracking controller, and the focus tracking controller tracks the light beam from the optical pickup device to the target track. In the same manner as in the recording operation, a digital read signal is generated from the light beam reflected from the optical disc via the amplifier/adaptive equalizer/digitizer, and the target sector is detected by the modulator/demodulator. The modulator/demodulator digitally demodulates the digital read signal obtained from the data recording area of the target sector, and supplies the result as the reproduced data to the host computer via the error detector and corrector (ECC) and passed through the interface unit (I/F).

The above operations are controlled by the control CPU and executed as a single continuous operation. It should be noted that description of a timing control circuit and other components common to a conventional recording and reproducing apparatus for an optical disk recording medium is omitted here.

FIRST EMBODIMENT

FIG. 1 shows a block construction of a data reproducing apparatus of an optical disk apparatus including a sampled amplitude read channel according to a first embodiment of the present invention where the read channel reads a reproduction signal from a disk medium and generates binary data therefrom, including an adaptive equalizer in a digital data reproducing apparatus. In this construction, an optical disk 1 is used as an example of a disk medium which has a sector format of a periodically wobbling recording groove. An optical pickup device 2 applies laser beams to the optical disk and reads the recorded data based on the quantity of the reflected light beams and generates an electric signal therefrom. A preamplifier 3 amplifies the output signal of the pickup device and generates a reproduction RF signal.

The read channel of the data reproducing apparatus includes an auto-gain controller (AGC) 4 for adjusting an amplitude of the reproduction signal to have a constant amplitude, an equalizer 5 for improving frequency characteristics of the output signal of the AGC 4, an A/D converter 6 for sampling the reproduction signal with a channel clock signal to constitute a digital read channel, and a PLL circuit 7 for phase-control with the output signal of the A/D converter 6 to generate a synchronization clock synchronized with the digital signal.

The data reproducing apparatus further includes a digital adaptive equalizer 8 for adaptively equalizing the discrete sampled data output of the A/D converter 6 to execute a predetermined partial response (PR) equalization, a Viterbi decoder 11 for generating a most likelihood binary data from the equalization results of the discrete sampled data of the reproduction signal, and a demodulator 12 for demodulating the binary digitized data output of the Viterbi decoder 11.

The data reproducing apparatus further includes an orthogonal shift detector 9 which receives tap coefficients of a FIR filter portion of the adaptive equalizer 8 and detects an orthogonal shift (i.e., tilt) between the recording surface of the optical disk 1 and the optical axis of the light beam irradiated from the optical pickup device 2 based on the tap coefficients to thereby generate an orthogonal shift signal corresponding to the orthogonal shift amount. The data reproducing apparatus further includes a tilt controller 10 for control-driving a tilt actuator of the optical pickup device 2 in accordance with the orthogonal shift signal output of the orthogonal shift detector 9 to adjust the tilt actuator to maintain the orthogonal relationship between the optical disk surface and the optical axis of the light beams.

FIG. 2 shows a construction of the pickup device 2 having the tilt actuator as mentioned above. The optical pickup device 2 includes an object lens 2a for condensing light beams, a holding member 2b for holding the object lens 2a, first and second magnetos 2c and 2d disposed on the end portions of the holding member 2b in the disk circumferential (i.e., track tangential) direction, a securing wire 2e for substantially securing the holding member 2b to a substrate of the optical pickup device, and first and second electromagnetic coils 2f and 2g which are opposed to the first and second magnetos 2c and 2d, respectively, with a prescribed space therefrom. In this construction, the direction and quantity of the current flowing through the electromagnetic coils 2f and 2g are controlled so that the inclination of the object lens 2a can be adjusted in the track tangential direction of the disk.

In this construction, the first and second magnetos 2c and 2d and the first and second electromagnetic coils 2f and 2g constitute the tilt actuator which functions as an orthogonal shift correction drive means. In this arrangement, it is noted here that the tilt actuator may adjust the inclination drive of the entire part of the optical pickup device in the track tangential direction of the optical disk.

FIG. 3 shows a construction example of the adaptive equalizer 8 shown in FIG. 1, which includes a FIR filter portion 21, an equalization error detector portion 22 and a tap coefficient renewer portion 23. The tap coefficient renewer portion 23 recursively renews the coefficients of the FIR filter portion 21 in accordance with the following Equation (1). The renewed tap coefficients are fed back to the FIR filter portion 21 and also fed to the orthogonal shift detector 9 in common.

Adaptive equalization is carried out in a digital data processing system by previously quantizing the reproduced signal using an A/D converter. The adaptive equalizer 8 operates according to a well known least mean square (LMS) algorithm.

According to the least mean square (LMS) algorithm, the FIR filter coefficient vector of the adaptive equalizer is recursively renewed based on Equation (1) as below:

$$h(n+1)=h(n)+\mu \cdot e(n) \cdot u(n) \qquad (1)$$

where h(n) represents a vector of filter coefficients before equalization; h(n+1) represents a vector of filter coefficients after equalization; $\mu$ is a programmable gain; e(n) represents a sample error between the filter's actual output and a desired output; and u(n) represents a vector of sample values input to the FIR filter. By this arrangement, the filter tap coefficients (i.e., frequency and phase response of the filter) are adapted until a minimum sample error is achieved.

FIG. 4 shows a construction example of the FIR filter portion 21 which receives the digital sampled data of the reproduction signal from the A/D converter 6. The FIR filter portion 21 includes delay units 30 for delaying the input sampled data in turn every reproduction clock periods obtained by the PLL 7, multipliers 31a to 31g (represented by "31" hereinafter) for multiplying coefficients Ci (i=1, ..., 7) applied from the tap coefficient renewer portion 23 by the delayed values Si (i=1, ..., 7) input to or output of the delay units 30, an adder 32 for obtaining a total sum $Y(t)=\Sigma Ci(t) \times Si(t)$, where i indicates an integer from 1 to 7 and t indicates a is present time, and further includes a signal selector 33 for selecting the input or output signal of each delay unit 30 in accordance with a counted value of a coefficient selecting counter (not shown) for time division processing. By this arrangement, the delayed values Si(t) output of the delay units 30 are fed to the equalization error detector 22 via the signal selector 33 while the total sum Y(t) output of the adder 32 is also fed to the error detector 22 and is also generated as the equalization result to be applied to the Viterbi decoder 11.

Figure 5:
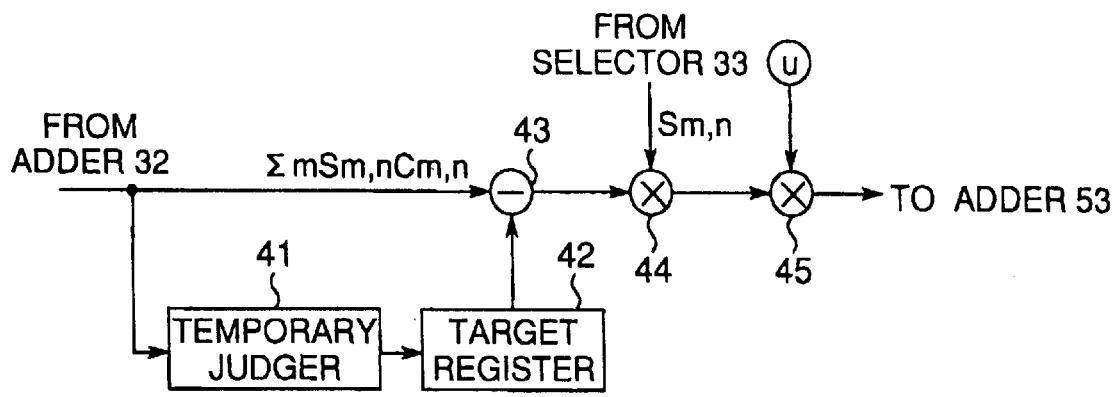
FIG. 5 is a block diagram showing a construction of an equalizing error detection unit.

FIG. 5 shows a construction example of the equalization error detector 22 which includes a temporary judger portion 41 receiving the total sum Y(t) output of the adder 32 and judging an equalization target value TL thereof, a target register 42 for registering the equalization target value TL, a subtracter 43 for subtracting the total sum Y(t) output of the adder 32 from the equalization target value TL output of the target register 42, a first multiplier 44 for multiplying the subtraction result output of the subtracter 43 by the selected delayed signal output of the signal selector 33, and a second multiplier 45 for multiplying the output of the first multiplier 44 by the predetermined programmable gain factor $\mu$.

Figure 6:
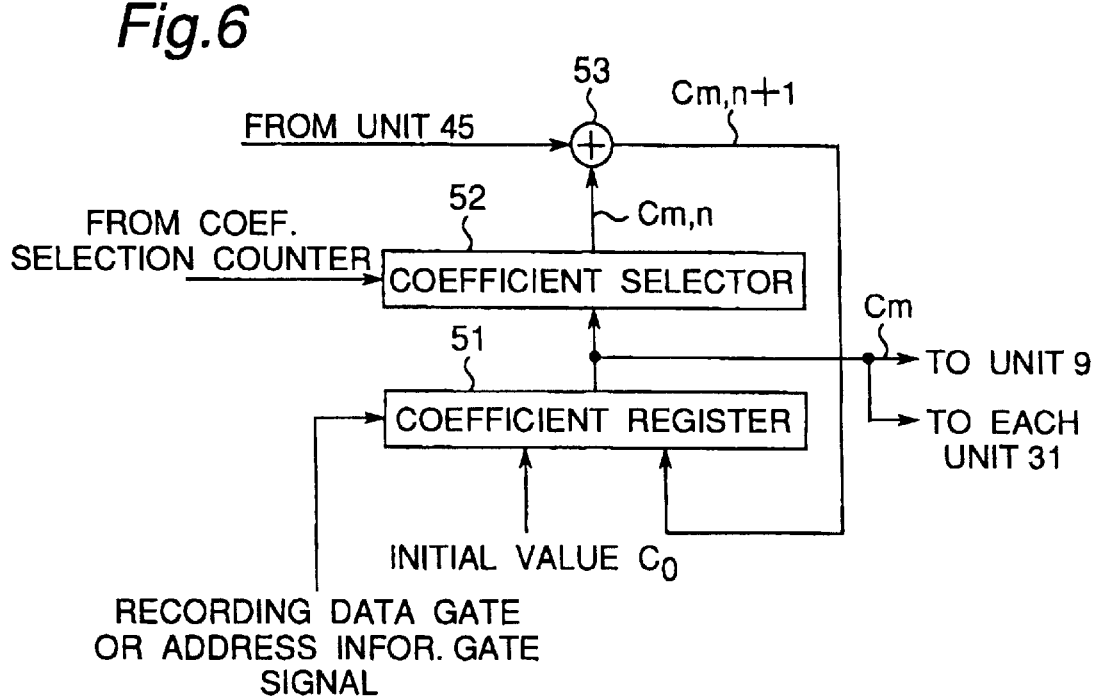
FIG. 6 is a block diagram showing an essential construction of a LMS coefficient calculation unit.

FIG. 6 shows a construction example of the tap coefficient renewer 23 which includes a coefficient register 51 for holding an initial coefficient value Co or renewed tap coefficients Cm, a coefficient selector 52 for selecting the output of the coefficient register 51 in accordance with a counted value of a coefficient selection counter (not shown) to generate the present tap coefficients and an adder 53 for adding the output of the second multiplier 45 of the equalization error detector 22 with the output of the coefficient selector 52 to thereby generate the renewed tap coefficients. In this construction, the registered tap coefficients Cm output of the coefficient register 51 are fed back to each of the multipliers 31 of the FIR filter 21 and also supplied to the orthogonal shift detector 9.

The following describes an operation of the adaptive equalizer 8. Initially, in the step of starting up the optical disk apparatus, the initial coefficient value Co is loaded to the coefficient register 51. The tap coefficients C1 to C7 are respectively applied to the multipliers 31a to 31g. When the digital reproduction signal Sn (at a time n) is sequentially applied to each of the delay units 30. of the FIR filter 21 from the A/D converter 6, the FIR filter 21 calculates the total sum Y(t)=ΣmSm,n×Cm,n to be outputted from the adder 32. According to Equation (1) of LMS algorithm, the m-th tap coefficient Cm is obtained as below:

$$Cm,n+1 = Cm,n + \mu \times Sm,n(TLn - \Sigma mSm,n \times Cm,n) \quad (2)$$

where $\mu$ is a step size parameter of the programmable gain, and m denotes a tap coefficient number represented by integers 1 to 7. In the right hand of this Equation (2), ΣmSm,n×Cm,n represents the output of the adder 32, (TLn−ΣmSm,n×Cm,n) represents the output of the subtracter 43 that is the equalization error, and μ×Sm,n(TLn−ΣmSm,n×Cm,n) represents the output of the second multiplier 45. Thus, the renewed tap coefficients Cm,n+1 are outputted from the adder 53 of the tap coefficient renewer 23 and fed back to the coefficient register 51.

The temporary judger 41 of the equalization error detector 22 judges which the target value the total sum supplied from the adder 32 of the FIR filter 21 should be. equalized to, and the judgment result is applied to the target register 42. The target register generates the judged equalization target value TL. The subtracter 43 subtracts the ΣmSm,n×Cm,n supplied from the adder 32 from the equalization target value TL to generate the equalization error.

In the FIR filter 21, the signal selector 33 selects the input or output Sm of each of the delay units 30 corresponding to the m-th tap coefficient Cm (m−1, ..., 7) in accordance with the output of the coefficient selection counter (not shown) and the selected signal Sm is supplied to the first multiplier 44 of the equalization error detector 22. The first multiplier 44 multiplies the selected signal Sm,n at present time n by the equalization error obtained by the subtracter 43 and the resultant value is supplied to the second multiplier 45. The second multiplier 45 multiplies the output of the first multiplier 44 by the step size parameter μ and the resultant output of the second multiplier 45 is supplied to the adder 53 of the tap coefficient renewer 23.

Similarly in the tap coefficient renewer 23, the coefficient selector 52 selects the m-th tap coefficient Cm in accordance with the output of the coefficient selection counter (not shown) and the selected tap coefficient Cm is supplied to the adder 53. The adder 53 adds the output of the second multiplier 45 of the equalization error detector 22 and the present m-th tap coefficient Cm,n output of the coefficient selector 52 to thereby generate a renewed m-th tap coefficient Cm,n+1. The coefficient register 51 newly holds the renewed tap coefficient. These processes are repeated in accordance with the coefficient counter (not shown) and the inter-code interference of the reproduction signal reproduced from the optical disk can be effectively removed to obtain the tap coefficients C1 to C7 for forming the most preferable reproduction signal.

Figure 7:
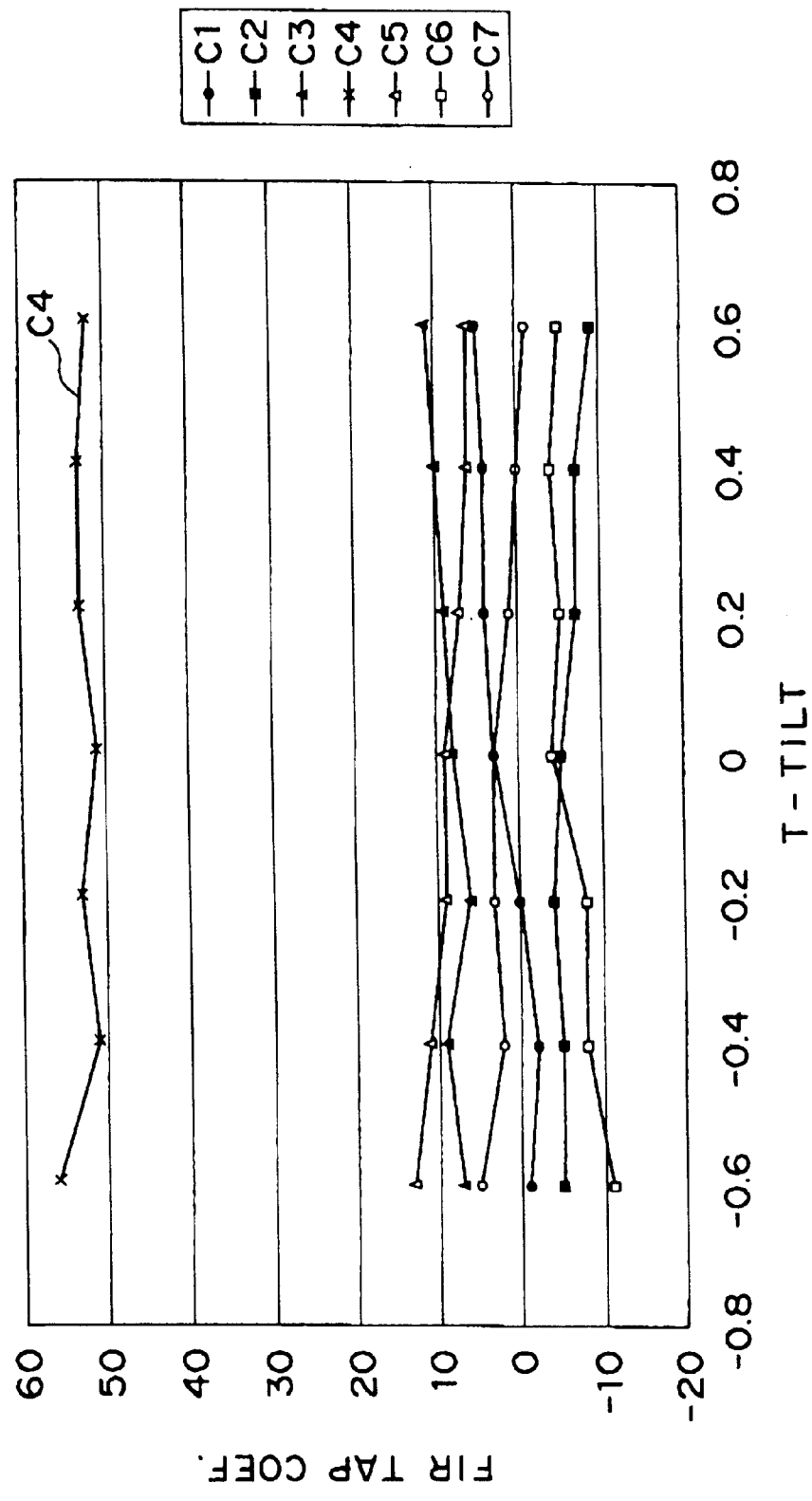
FIG. 7 is a graph view showing a learning result of the LMS coefficient calculation unit.

FIG. 7 is a graph showing equalization learning results of the tap coefficients of the FIR filter 21 when the adaptive equalizer 8 receives a reproduction signal actually added with a tilt in a track tangential direction of the disk (referred to as "T tilt" hereinafter). In this graph, except for the tap coefficient C4 to be applied to the center-positioning (i.e., fourth) multiplier 31d, in each of the symmetrical tap coefficients pairs (C1 and C7), (C2 and C6), and (C3 and C5) in time delay input order thereof, the tap coefficients are interrelated to each other.

Figure 8:
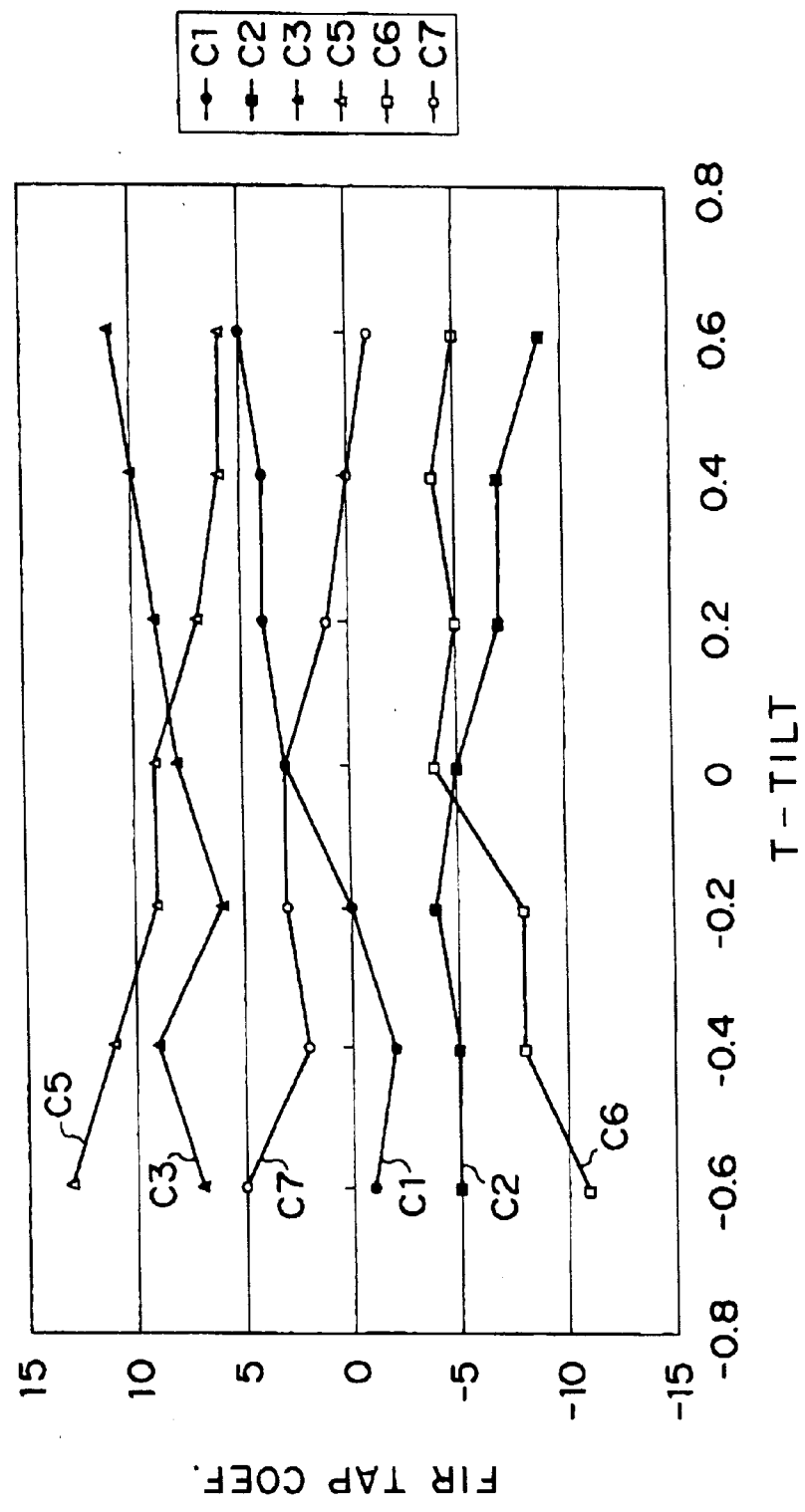
FIG. 8 is a graph view shown an essential part of the learning result shown in FIG. 7.

FIG. 8 is a partially enlarged graph of FIG. 7 deleting the center-positioning tap coefficient C4, where the horizontal axis represents the T tilt value and the vertical axis represents the tap coefficient value.

Figure 9C:
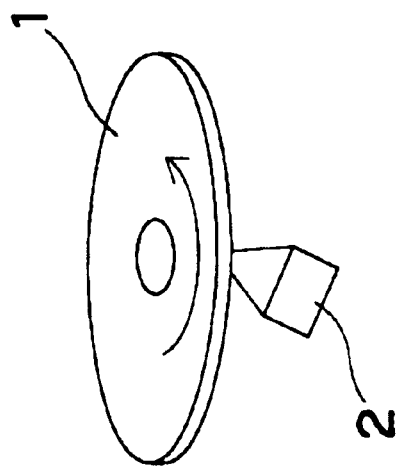
FIGS. 9A, 9B and 9C are schematic views explaining a tilt adjusting direction.
Figure 9B:
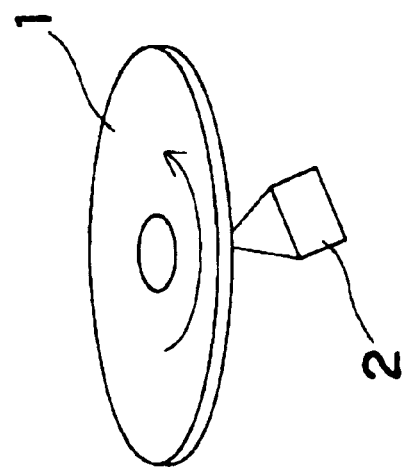
Figure 9A:
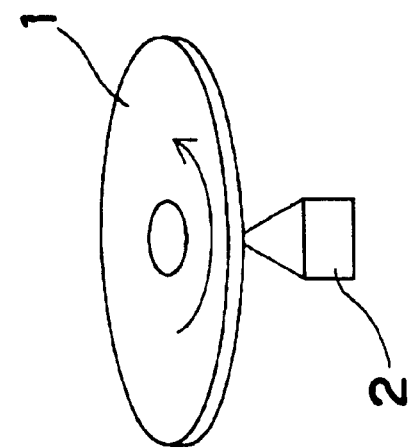

FIGS. 9A, 9B and 9C show a normal condition, plus (+) condition and minus (−) condition of the tilt direction with respect to the orthogonal relationship between the optical disk surface and the optical axis of the optical pickup device 2, respectively. As apparently seen from these figures in connection with the graph of FIG. 8, concentrating attention to, for example, the tap coefficient pair of C1 and C7, the tap coefficient relationship is C1<C7 when the T tilt is in the minus direction, and the tap coefficient relationship is C1>C7 when in the plus direction. Similarly, concentrating attention to, for example, the pair of C3 and C5, the tap coefficient relationship is C3<C5 when the T tilt is in the minus direction, and the tap coefficient relationship is C3>C5 when in the plus direction. Also, concentrating attention to, for example, the pair of C2 and C6, the tap coefficient relationship is C2>C6 when the T tilt is in the minus direction, and the tap coefficient relationship is C2<C6 when in the plus direction.

When the T tilt is 0 (zero), the relationships are C1=C7, C3≈C5, and C2≈C6. Accordingly, the orthogonal shift can be controlled using the combination of the tap coefficients pairs in the orthogonal shift detector 9. For example, when (C7−C1) is plus, it is judged that the T tilt is minus, and the optical pickup device 2 is adjusted to a plus direction, and when (C7−C1) is minus, it is judged that the T tilt is plus, and the optical pickup 2 is adjusted to a minus direction, and thus the T tilt can be corrected.

For example, assuming that an ideal spot shape of the light beams to be projected to the optical disk is true circle, when a T tilt is generated, the light beams are applied from the optical pickup device to the disk surface with some inclination, and therefore the beam spot shape is elliptically distorted and there arises a biased or unbalanced distribution in intensity of the light beams due to the effect of the aberration. The distortion of the beam spot is affected more largely in the inclined direction of the optical pickup device. The adaptive equalizer 8 is operated to execute the equalization in a direction to remove the effect of the aberration. Therefore, the symmetrical balanced condition of the right and left tap coefficients in each pair with respect to the center-positioning tap coefficient C4 is made unbalanced when a T tilt is caused.

That is, when the tap coefficients in each pair are made symmetrical in right and left sides, namely, when the tap coefficients in each pair are coincident with each other, the influence of the aberration due to the tilt can be made minimum. In this connection, the relationship between the unbalanced condition of the tap coefficients and the direction of the tilt is varied in accordance with the light beam spot and the tap interval.

Next, the following describes a tilt control operation in the reproducing operation of the optical disk apparatus shown in FIG. 1.

The preamplifier 3 amplifies the output signal of the pickup device and generates the reproduction RF signal. The auto-gain controller (AGC) 4 adjusts an amplitude of the reproduction signal to have a constant amplitude, and the equalizer 5 improves the frequency characteristics of the output signal of the AGC 4. The A/D converter 6 samples the reproduction signal with a channel clock signal to constitute a digital read channel, and the PLL circuit 7 executes the phase-lock control with the output signal of the A/D converter 6 to generate a synchronization clock synchronized with the digital signal.

The digital adaptive equalizer 8 adaptively equalizes the discrete sampled data output of the A/D converter 6 to execute the predetermined equalization to generate the LMS tap coefficients C1 to C7 for forming the most preferable reproduction signal in each of the positions in the track tangential direction of the disk. When the tap coefficients C1 to C7 are supplied to the orthogonal shift detector 9, the orthogonal shift detector. 9 calculates the subtraction of, for example, (C7−C1) to generate the orthogonal shift signal to be applied to the tilt controller 10.

When the orthogonal shift signal is plus, the inclination of the optical pickup device is corrected to a plus direction as shown in FIG. 9B by controlling the current flowing through the first and second electromagnetic coils 2f and 2g. On the contrary, when the orthogonal shift signal is minus, the inclination of the optical pickup device is corrected to a minus direction as shown in FIG. 9C by controlling the current flowing through the first and second electromagnetic coils 2f and 2g. Thus, the orthogonal shift can be made minimum or substantially zero as shown in FIG. 9A. As a result, the T tilt of the disk can be corrected and the preferable disk reproduction signal can be obtained with eliminating the inter-code interference. Also, the inter-code interference, which can not be eliminated by the tilt control operation, is effectively processed by the adaptive equalizer 8 and the most suitable reproduction signal can be applied from the adaptive equalizer 8 to the Viterbi decoder 11. The Viterbi decoder 11 generates a most likelihood binary data from the equalization results of the discrete sampled data of the reproduction signal, and then the demodulator 12 demodulates the binary digitized NRZI data output of the Viterbi decoder 11, recovering the user data format before subjection to modulation.

As described above, according the first embodiment of the present invention, even in the case where an optical disk or a drive system comprised of an optical pickup includes a T tilt, a most suitable tilt control can be executed adaptively in each position of the track tangential direction of the disk with high accuracy by a simple construction. Thus, the most suitable reproduction signal can be produced in the disk reproducing system, and the disk reproduction margin can be secured even with a high recording density of the disk.

SECOND EMBODIMENT

Figure 10:
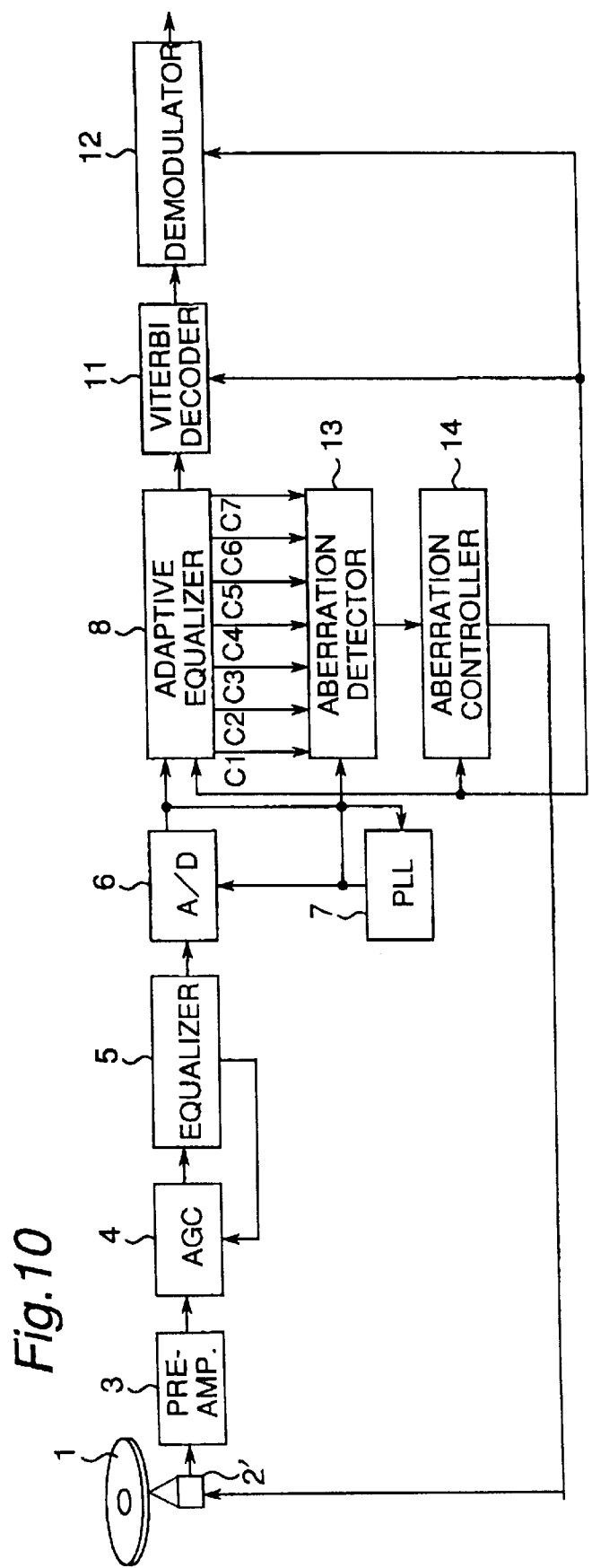
FIG. 10 is a block diagram of an optical disk apparatus according to a second embodiment of the present invention.

FIG. 10 shows a block construction of a data reproducing apparatus according to a second embodiment of the present invention. The different points from the first embodiment reside in the fact that, aberrration correction is performed instead of performing a tilt control in the track tangential direction of the optical disk, using a liquid crystal aberration correction unit instead of using the tilt actuator in the optical pickup 2, using an aberration detector 13 instead of using the orthogonal shift detector 9, and using an aberration controller 14 instead of using the tilt controller 10, thereby constituting an aberration correcting system for correcting an aberration distortion due to an orthogonal shift and the like of a beam spot projected onto a recording surface of the disk to obtain a preferable reproduction signal waveform.

Figure 11:
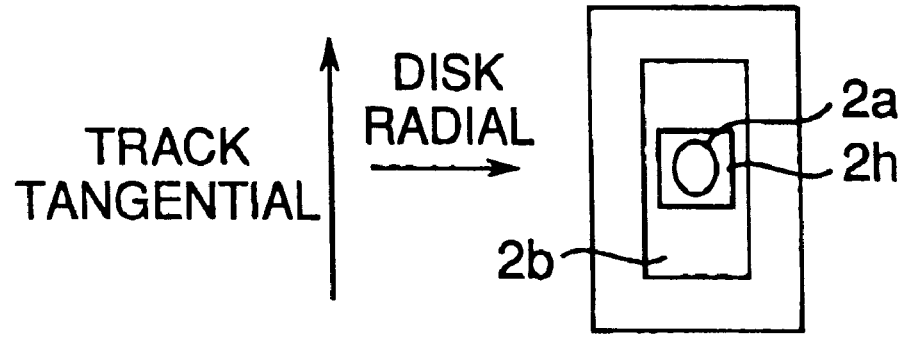
FIG. 11 is a schematic plan view showing a construction of an optical pickup device according to the second embodiment.

FIG. 11 shows a construction of an optical pickup 2' in the optical disk apparatus of the second embodiment, where 2a denotes an object lens and 2h denotes a liquid crystal aberration correction unit adapted to the aberration correcting system.

Figure 12:
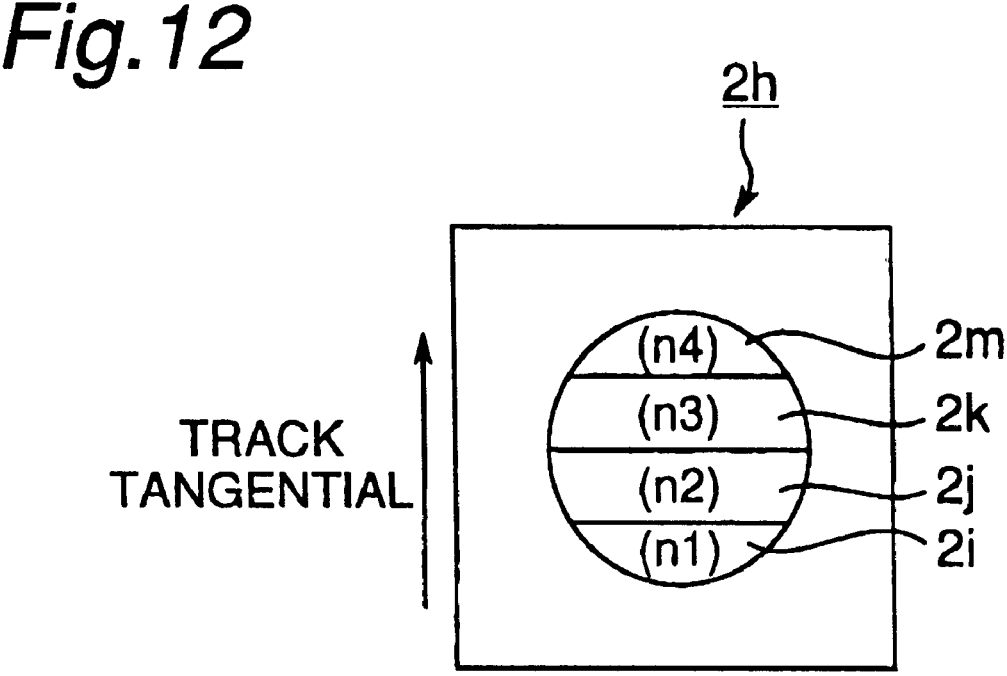
FIG. 12 is a schematic plan view showing a liquid crystal aberration correction element adapted to the optical pickup device shown in FIG. 11.

FIG. 12 shows a constitution example of the liquid crystal (LC) correction unit 2h where the liquid crystal correction unit 2h is divided into, for example, four segments in the track tangential direction of the disk, that is, first to fourth LC tilt correction elements 2i, 2j, 2k and 2m arranged in this order in the disk rotational direction. Each segment of the tilt correction elements is composed of a liquid crystal element having a variable light refractive index independently.

Next, the following describes the operation of the second embodiment having the construction mentioned above in connection with only the different portions from the first embodiment, and explanation of the redundant portions is omitted here. In this operation, it can be assumed that the aberration in the track tangential direction of the disk is mainly caused by a T tilt. Therefore, the method of detecting the orthogonal shift described in the first embodiment can be employed in this embodiment, using a comparison in the combination of the tap coefficients obtained by the adaptive equalizer 8.

Thus, in the aberration detector 13, in a similar manner to that of the orthogonal shift detection, the aberration detection signal can be obtained using the comparison in each pair of the tap coefficients obtained by the FIR filter portion 21 of the adaptive equalizer 8. For example, assuming that the light refractive indexes of the first through fourth tilt correction elements 2i, 2j, 2k and 2m are n1, n2, n3 and n4 in this order, when (C7−C1) is plus, the aberration controller 14 appropriately controls each of the refractive indexes to be n1<n2<n3<n4. When (C7−C1) is minus, the aberration controller 14 controls each of the refractive indexes to be n1>n2>n3>n4 so that the aberration can be corrected.

As described above, according to the second embodiment of the present invention, the aberration control adaptive to each position of the disk circumferential direction can be effectively executed for the disk or drive system including the optical pickup having an aberration in the track tangential direction of the disk. Therefore, the most preferable reproduction signal can be produced in the disk reproducing apparatus, and a good reproduction margin can be secured even when using a disk with high recoding density.

Figure 13:
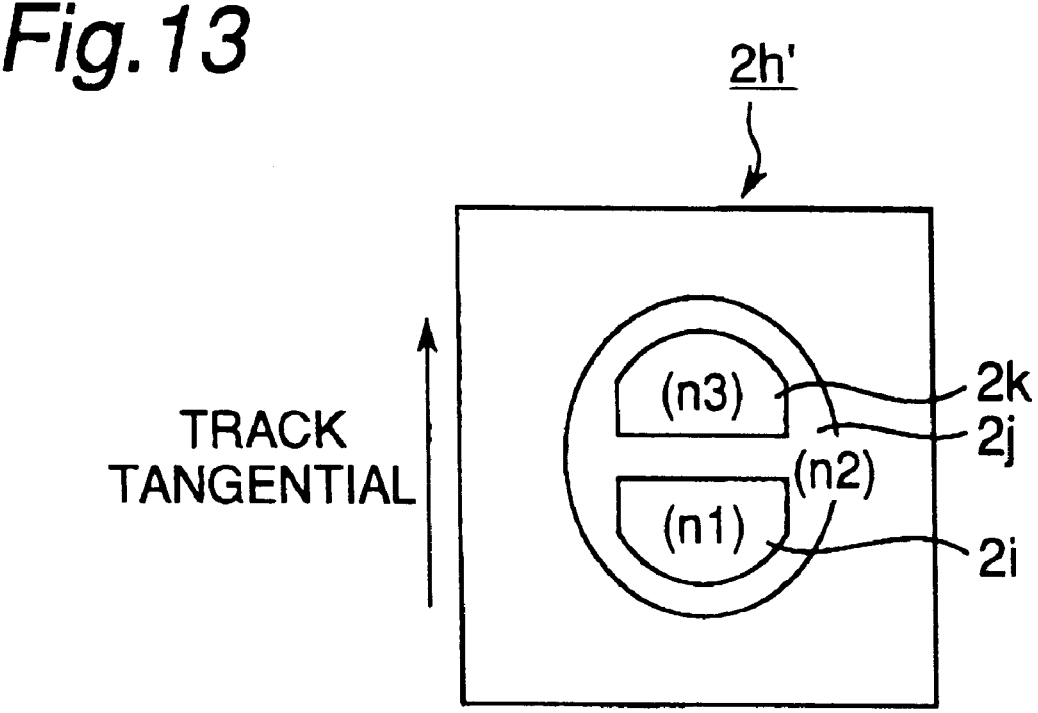
FIG. 13 is a schematic plan view showing another example of a liquid crystal aberration correction element.

It is noted here that, although the liquid crystal aberration correcting unit 2h is divided into four segments, it is not limited to this and division and type thereof can be appropriately changed according to the type of the aberration to be corrected. For example, as shown in FIG. 13, a liquid crystal aberration correcting unit 2h' may be divided into three segments, that is, first to third tilt correction elements 2i, 2j and 2k, where the first and third elements 2i and 2k respectively having refractive indexes n1 and n3 are arranged in the track tangential direction of the disk rotational direction and the second element 2j occupies the radial center portion and surrounding portion thereof. Moreover, the optical pickup 2' having the liquid crystal aberration correcting unit 2h or 2h' of the second embodiment may be used in combination with the tilt controlling apparatus having the orthogonal shift detector 9 and tilt controller 10 of the first embodiment.

THIRD EMBODIMENT

Figure 14:
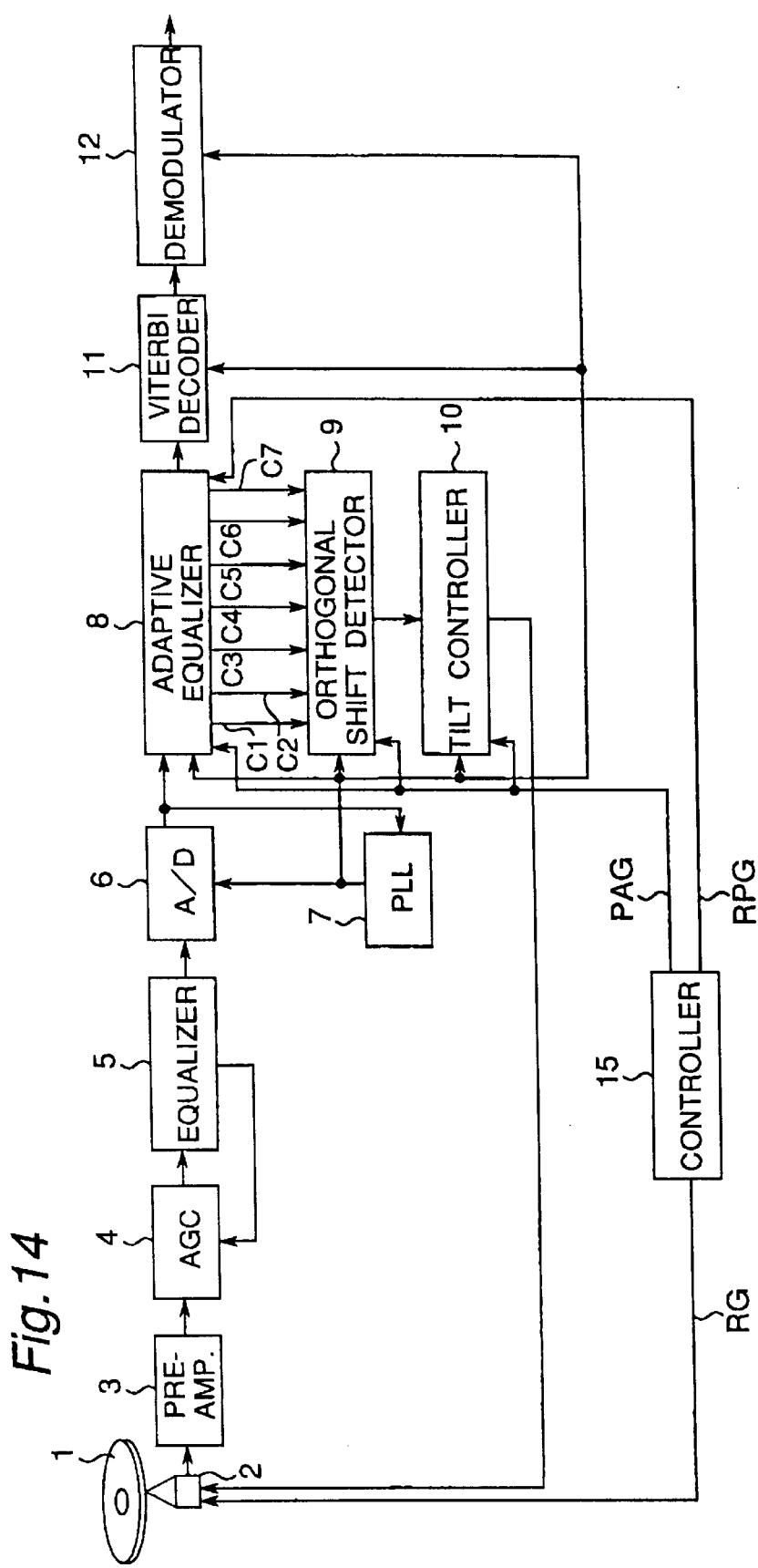
FIG. 14 is a block diagram of an optical disk apparatus according to a third embodiment of the present invention.

FIG. 14 shows a block construction of an optical disk apparatus according to the third embodiment of the present invention. In this embodiment, the tilt control system of the first embodiment as shown in FIG. 1 is employed, and a different point therefrom is that a system controller (control CPU) 15 is further provided for controlling the adaptive equalizer 8, orthogonal shift detector 9, tilt controller 10 and optical pickup device 2 to consntitute a data recording and reproducing apparatus. It is noted here that FIG. 14 mainly shows the construction of the disk reproducing system, omitting the construction of the disk recording system here since the disk recording system is already described with reference to FIG. 19.

FIGS. 15A through 15G show timing charts in connection with a sector format of a recording guide groove formed on e.g. a DVD-RAM as a disk medium, where FIG. 15A shows a disk sector format, each sector is comprised of a prepit address region 61 formed of emboss prepits and an information (i.e., user data) recording region 62 having, for example, a periodically wobbling recording guide groove. The prepit address region 61 is shifted by a half track distance from the recording guide groove. The information recording region 62 is a data rewritable region for recording user data. FIGS. 15B and 15C show the RF signals output of the preamplifier 3 when recording of the user data information is not executed (FIG. 15B) and when recording of the user data information is executed (FIG. 15C). FIGS. 15D through 15G show various control signals such as a prepit address gate signal PAG, recording gate signal RG, reproduction gate signal RPG and learning reproduction gate signal LRPG, respectively, which the control gate signals are generated by the system controller 15.

Figure 15:
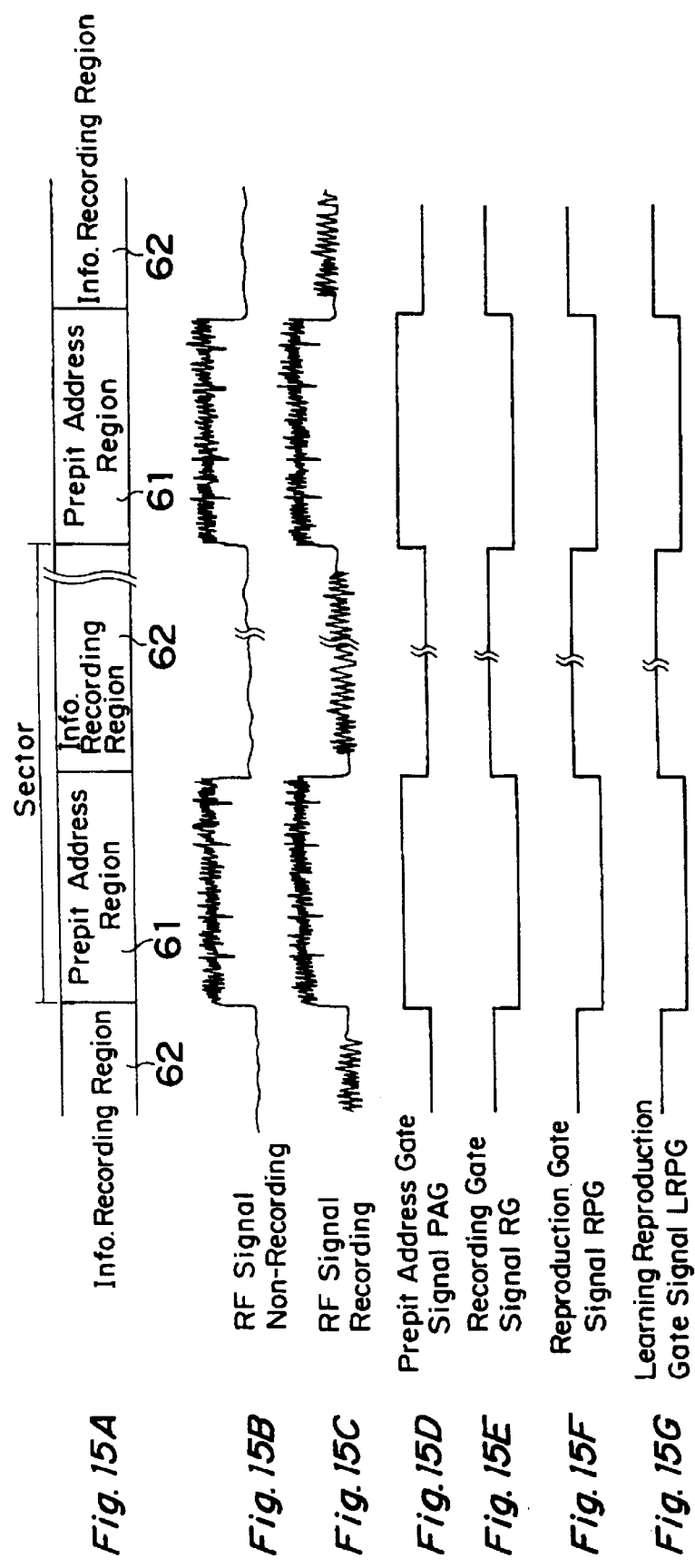
FIGS. 15A, 15B, 15C, 15D, 15E, 15F and 15G are timing charts for explaining operations of the third to sixth embodiments.

The following describes the control operation of the optical disk apparatus according to the third embodiment with reference to FIGS. 14 and 15, concentrating attention to the difference point from the first embodiment.

In the recording operation for recording data to the optical disk, when the optical pickup seeks and tracks a sector to be recorded, the system controller 15 transmits the prepit address gate signal PAG to the adaptive equalizer 8, orthogonal shift detector 9 and tilt controller 10. When the prepit address gate signal PAG is in High (=1) level, the adaptive equalizer 8 executes the adaptive equalization so that the reproduction signal read out of the prepit address region 61 is made optimal, and the orthogonal shift detector 9 calculates a tap coefficient comparison of, for example, (C7–C1) upon receipt of the tap coefficients of the FIR filter 21 and generates the orthogonal shift signal. The tilt controller 10 controls the tilt actuator of the optical pickup 2 in the same manner as that of the tilt control operation described in the first embodiment. Thus, the orthogonal shift between the disk surface and the optical axis of the light beams of the optical pickup is made minimum (i.e, substantially zero).

When the optical pickup 2 advances to track the information recording region 62 and the prepit address gate signal PAG is in Low (=0) level, the system controller 15 transmits the recording gate signal RG to the optical pickup 2 while the last control operations to the prepit address region 61 executed by the adaptive equalizer 8, orthogonal detector 9 and tilt controller 10 are maintained in this region. Upon receipt of the recording gate signal RG, the optical pickup 2 is controlled by the laser drive unit (LPC) shown in FIG. 19 to record the desired user data signal to the disk during the High (=1) level of the recording gate signal RG.

Next, in the reading operation for reproducing data from the optical disk, in a similar manner to that of the recording operation, when the prepit address gate signal PAG is in High (=1) level, the adaptive equalizer 8 executes the adaptive equalization so that the reproduction signal read out of the prepit address region 61 is made optimal, and the orthogonal shift detector 9 calculates, for example, (C7–C1) upon receipt of the tap coefficients of the FIR filter 21 and generates the orthogonal shift signal. The tilt controller 10 controls the tilt actuator of the optical pickup 2, so that the orthogonal shift between the disk surface and the optical axis of the light beams of the optical pickup is made minimum (i.e, substantially zero).

When the optical pickup 2 advances to track the information recording region 62 and the prepit address gate signal PAG is in Low (=0) level, the system controller 15 transmits the reproduction gate signal RPG to the adaptive equalizer 8 while the last control operations to the prepit address region 61 executed by the orthogonal detector 9 and tilt controller 10 are maintained. Subsequently, the reproduction signal of the data information read out of the information recording region 62 is supplied to the adaptive equalizer 8 via the preamplifier 3, AGC 4, equalizer 5 and via the A/D converter 6. As the reproduction signals of the prepit address region 61 and the information recording region 62 are different in signal quality, the adaptive equalizer 8 newly executes the adaptive equalization to the information recording region 62 so that the disk reproduction signal is made into the optimal reproduction signal, and the error due to inter-code interference remaining after conducting the tilt control is processed to be eliminated. Then the resultant optimal reproduction signal is applied to the Viterbi decoder 11. The Viterbi decoder 11 digitizes the input reproduction signal and the binary NRZI signal is demodulated by the demodulator 12 and the resultant reproduction data of the recovered user data format is sent out to a subsequent processing unit (not shown).

As described above, according to the third embodiment, even in the recording operation for recording data to the optical disk, an adaptive tilt control can be executed in each position of the track tangential direction of the disk to the disk or disk drive system having a T tilt. Accordingly, when the data is recorded to the disk, the recording operation can be performed in the optimally T tilt controlled condition. Also, in the data reproducing operation, the reproduction signal can be formed in the optimally T tilt controlled condition. Thus, a good recording and reproducing margin can be obtained in the disk even having a high recording density.

It is noted here that, although the adaptive equalization and tilt control are executed over the enntire part of the prepit address region 61 in the third embodiment, these control operations can be executed using a part of the prepit address region. Moreover, although the recording operation is conducted at the same time of equalization learning control operation of the reproduction signal read our of the prepit address region, it may be possible that the learned result of the orthogonal shift signal is previously stored in a temporary storage portion and the stored orthogonal shift signal is used to conduct the tilt control when the data is recorded to the disk. Moreover, the track to be previously learned may be different from a target track to be recorded.

In addition, in the third embodiment, although the tilt control in the data reproducing operation is executed only based on the reproduciotn data of the prepit address region 61 and the tilt control is maintained in the reproducing operation of the user data information of the information recording region 62, the tilt control may be always executed also in the reproducing operation of the user data information of the information recording region 62 in a similar manner to that of the first embodiment.

FOURTH EMBODIMENT

Figure 16:
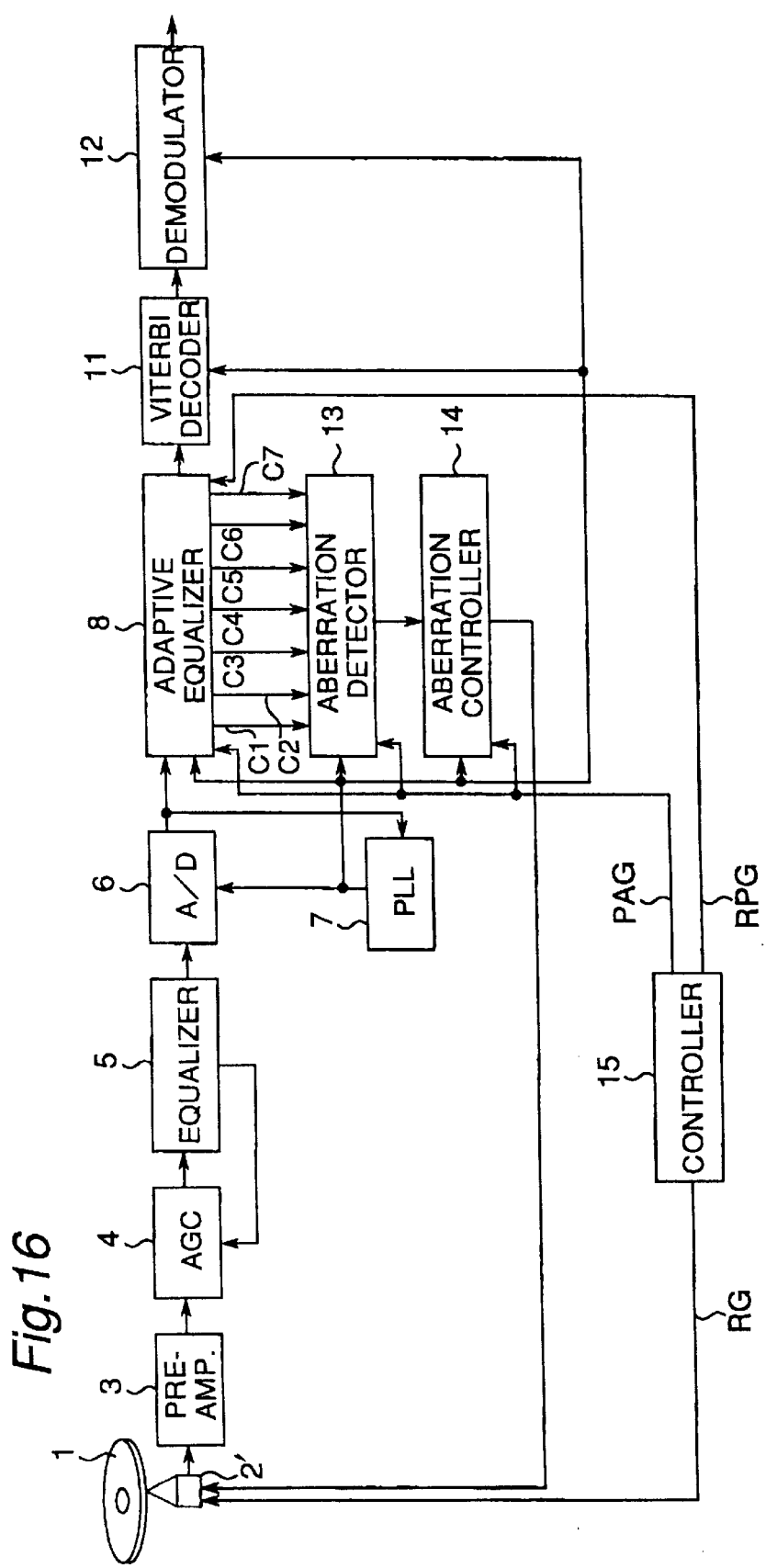
FIG. 16 is a block diagram of an optical disk apparatus according to a fourth embodiment of the present invention.

FIG. 16 shows a block construction of an optical disk apparatus according to the fourth embodiment of the present invention. In this embodiment, the aberration correction control system of the second embodiment as shown in FIG. 10 is employed, and a different point therefrom is that a system controller (control CPU) 15 is further provided for controlling the adaptive equalizer 8, aberration detector 13, aberration controller 14 and optical pickup device 2 to consntitute a data recording and reproducing apparatus. It is noted here that FIG. 16 mainly shows the construction of the disk reproducing system, omitting the construction of the disk recording system here since the disk recording system is already described with reference to FIG. 19. Therefore, the difference point from the third embodiment is that, the optical pickup 2 is replaced by the optical pickup 2', the orthogonal shift detector 9 is replaced by the aberration detector 13 and the tilt controller 10 is replaced by the aberration controller 14.

The following describes the control operation of the optical disk apparatus according to the fouth embodiment with reference to FIGS. 15 and 16, concentrating attention to the difference point from the second embodiment.

In the recording operation for recording data to the optical disk, when the optical pickup seeks and tracks a sector to be recorded, the system controller 15 transmits the prepit address gate signal PAG to the adaptive equalizer 8, aberration detector 13 and aberration controller 14. When the prepit address gate signal PAG is in High (=1) level, the adaptive equalizer 8 executes the adaptive equalization so that the reproduction signal read out of the prepit address region 61 is made optimal, and the aberration detector 13 calculates a tap coefficient comparison of, for example, (C7–C1) upon receipt of the tap coefficients of the FIR filter 21 and generates the aberration detection signal. The aberration controller 14 controls the liquid crystal tilt correction unit 2h of the optical pickup 2' to adjust the light refractive indexes of the first to fourth liquid crystal tilt correction elements 2i, 2j, 2k and 2m, indivisually in the same manner as that of the aberration correction control operation described in the second embodiment. Thus, the aberration of the light beams is made minimum (i.e, substantially zero).

When the optical pickup 2' advances to track the information recording region 62 and the prepit address gate signal PAG is in Low (=0) level, the system controller 15 transmits the recording gate signal RG to the optical pickup 2' while the last control operations to the prepit address region 61 executed by the adaptive equalizer 8, aberration detector 13 and aberration controller 14 are maintained in this region. Upon receipt of the recording gate signal RG, the optical pickup 2' is controlled by the laser drive unit (LPC) shown in FIG. 19 to record the desired user data signal to the disk during the High (=1) level of the recording gate signal RG.

Next, in the reading operation for reproducing data from the optical disk, in a similar manner to that of the recording operation, when the prepit address gate signal PAG is in High (=1) level, the adaptive equalizer 8 executes the adaptive equalization so that the reproduction signal read out of the prepit address region 61 is made optimal, and the aberration detector 13 calculates, for example, (C7–C1) upon receipt of the tap coefficients of the FIR filter 21 and generates the aberration detection signal. The aberration controller 14 controls the liquid crystal tilt correction unit 2h of the optical pickup 2' to individually adjust the first to fourth tilt correction elements 2i, 2j 2k and 2m, so that the aberration is made minimum (i.e, substantially zero).

When the optical pickup 2' advances to track the information recording region 62 and the prepit address gate signal PAG is in Low (=0) level, the system controller 15 transmits the reproduction gate signal RPG to the adaptive equalizer 8 while the last control operations to the prepit address region 61 executed by the aberration detector 13 and aberration controller 14 are maintained. Subsequently, the reproduction signal of the data information read out of the information recording region 62 is supplied to the adaptive equalizer 8 via the preamplifier 3, AGC 4, equalizer 5 and via the A/D converter 6. As the reproduction signals of the prepit address region 61 and the information recording region 62 are different from each other in signal quality, the adaptive equalizer 8 newly executes the adaptive equalization to the information recording region 62 so that the disk reproduction signal is made into the optimal reproduction signal, and the error due to inter-code interference remaining after conducting the aberration correction control is processed to be eliminated. Then the resultant optimal reproduction signal is applied to the Viterbi decoder 11. The Viterbi decoder 11 digitizes the input reproduction signal and the binary NRZI signal is demodulated by the demodulator 12 and the resultant reproduction data of the recovered user data format is sent out to a subsequent processing unit (not shown).

As described above, according to the fourth embodiment, even in the recording operation for recording data to the optical disk, an adaptive aberration correction control can be executed in each position of the track tangential direction of the disk to the disk or disk drive system having an aberration in the track tangential direction. Accordingly, when the data is recorded to the disk, the recording operation can be performed in the optimally aberration correction controlled condition. Also, in the data reproducing operation, the reproduction signal can be formed in the optimally aberration correction controlled condition. Thus, a good recording and reproducing margin can be obtained even having a high recording density in the disk.

It is noted here that, in the fourth embodiment, although the adaptive equalization and aberration correction controls are executed over the enntire part of the prepit address region 61, these control operations can be executed using a part of the prepit address region. Moreover, although the recording operation is conducted at the same time of the equalization learning control operation in the data reproducing operation reading our of the prepit address region, it may be possible that the learned result of the aberration detection signal is previously stored in a temporary storage portion and the stored aberration detection signal is used to conduct the aberration correction control when the data is recorded to the disk. Moreover, the track to be previously learned may be different from a target track to be recorded.

In addition, in the fourth embodiment, although the aberration correction control in the data reproducing operation is executed only based on the reproduciotn data of the prepit address region 61 and the aberration correction control is maintained in the reproducing operation of the user data information of the information recording region 62, the aberration correction control may be always executed also in the data reproducing operation of the user data information of the information recording region 62 in a similar manner to that of the secoxnd embodiment.

FIFTH EMBODIMENT

Figure 17:
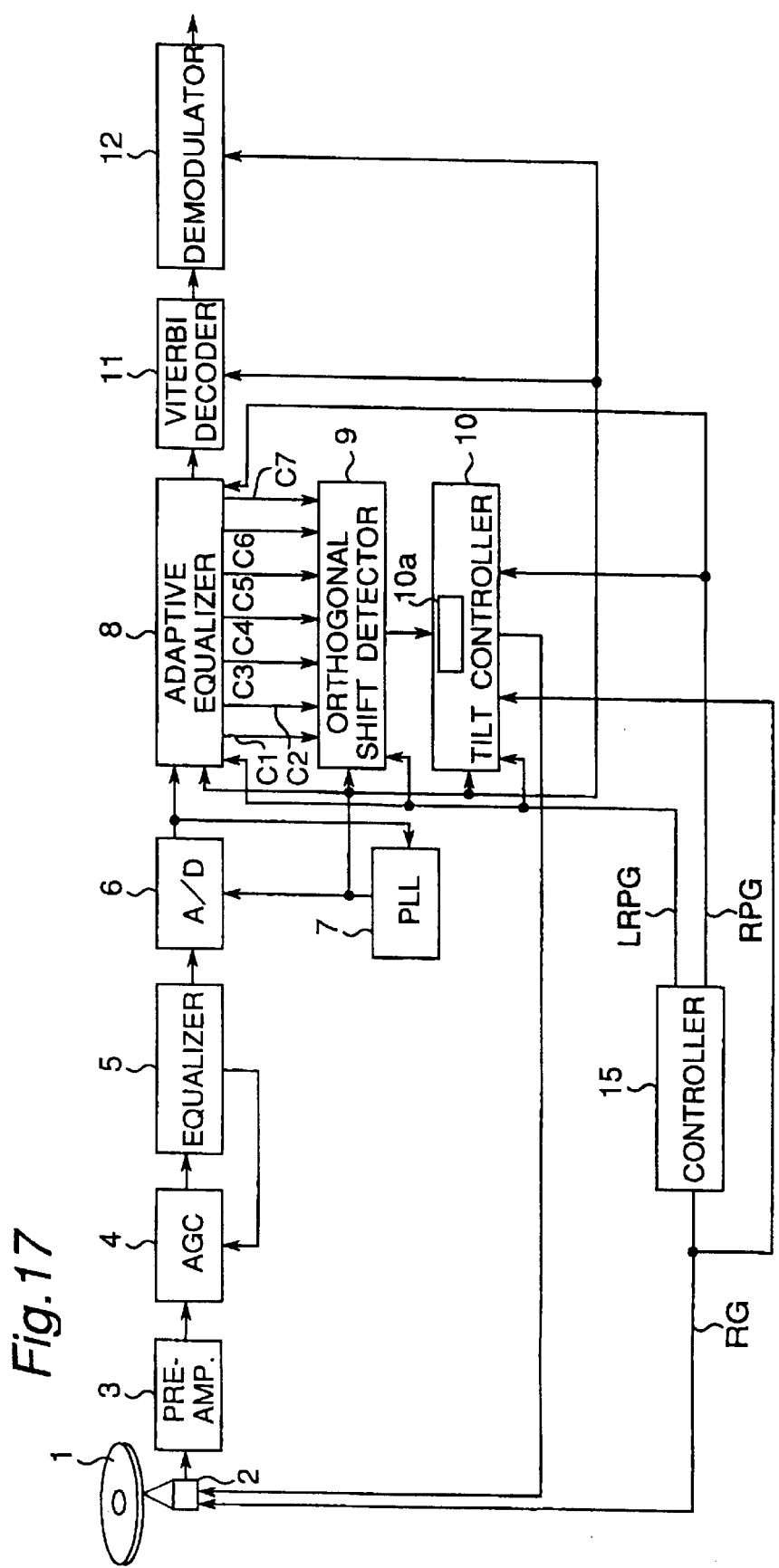
FIG. 17 is a block diagram of an optical disk apparatus according to a fifth embodiment of the present invention.

FIG. 17 shows a block construction of an optical disk apparatus according to the fifth embodiment of the present invention which is basically similar to that of the third embodiment shown in FIG. 14. In this fifth embodiment, the difference poin from the third embodiment is merely that the kind of the control gate signals output of the system controller 15 and the connecting destination thereof are changed from those of the third embodiment.

The following describes the control operation of the optical disk apparatus according to the fifth embodiment with reference to FIGS. 15 and 17, concentrating attention to the difference point from the third embodiment.

When the disk apparatus is started or immediately before the recording operation, the tracking controller controls the optical pickup to seek a track for learning the tilt control provided on the optical disk. Then, the tilt control is fixed to a neutral position and the learning information is recorded to the information recording region 62 during the High level 1 of the recording gate signal RG generated by the system controller 15. Next, the information recorded on the subject track for learning is reproduced while the tilt control remins to be fixed to the neutral condition, and the informationto recorded to the information recording region 62 is reproduced during the High level 1 of the learning reproduction gate signal LRPG shown in FIG. 15G. Upon receipt of the learning reproduction gate signal LRPG, the adaptive equalizer 8 executes the adaptive equalization so that the reproduction signal read out of the information recording region 62 is made optimal, and the orthogonal shift detector 9 calculates a tap coefficient comparison of, for example, (C7–C1) of the tap coefficients of the FIR filter 21 and generates the orthogonal shift signal. The tilt controller 10 previously and temporarily stores the orthogonal shift signal for an information amount of one track in a temporary storage portion 10a in association with the position in the track tangential direction of the disk.

When the optical pickup 2 advances to track a sector to be recorded, the system controller 15 transmits the recording gate signal RG to the optical pickup 2 and to the tilt controller 10. During the High level 1 of the recording gate signal RG, the tilt controller 10 controls the tilt actuator of the optical pickup 2 in accordance with the orthogonal shift signal previously stored in the temporary storage portion 10a so that the orthogonal shift is made minimum. Upon receipt of the recording gate signal RG, the optical pickup 2 is controlled by the laser drive unit (LPC) shown in FIG. 19 to record the desired data signal to the disk during the High (=1) level of the recording gate signal RG.

Next, in the reading operation for reproducing data from the optical disk, in a similar manner to that of the recording operation, when the optical pickup 2 advances to track a sector to be reproduced, the system controller 15 transmits the reproduction gate signal RPG to the adaptive equalizer 8 in common to the tilt controller 10. During the High level 1 of the reproduction gate signal RPG, the tilt controller 10 controls the tilt actuator of the optical pickup 2 in accordance with the orthogonal shift signal previously stored in the temporary storage portion 10a so that the orthogonal shift is made minimum. Subsequently, the reproduction signal of the data information read out of the information recording region 62 is supplied to the adaptive equalizer 8 via the preamplifier 3, AGC 4, equalizer 5 and via the A/D converter 6. The adaptive equalizer 8 renews the tap coefficients and newly executes the adaptive equalization to the information recording region 62 so that the disk reproduction signal is made into the optimal reproduction signal, and the error due to inter-code interference remaining after conducting the tilt control is processed to be eliminated. Then the resultant optimal reproduction signal is applied to the Viterbi decoder 11. The Viterbi decoder 11 digitizes the input reproduction signal and the binary NRZI signal is demodulated by the demodulator 12 and the resultant reproduction data of the recovered user data format is sent out to a subsequent processing unit (not shown).

As described above, according to the fifth embodiment, even in the recording operation for recording data to the optical disk, an adaptive tilt control can be executed in each position of the disk track tangential direction to the disk or disk drive system having a T tilt. Accordingly, when the data is recorded to the disk, the recording operation can be performed in the control condition optimally regulating the T tilt. Also, in the data reproducing operation, the reproduction signal can be formed in the control condition optimally regulating the T tilt. Thus, a good recording and reproducing margin can be obtained in the disk even having a high recording density.

It is noted here that, as a recording track for preciously learning, a neighboring track adjacent to the subject track to be recorded may be used. Moreover, the recording track for preciously learning may be a subject track per se before subject to overwrite. The recording track for preciously learning may be a track adjacent to the subject track to be recorded where the track for learning has recorded the learning information immediately before the adjacent recording track is subject to recording.

In addition, in the fifth embodiment, although the adaptive equalization learning is executed only during the High level 1 of the learning reproduction gate signal LRPG and the tilt control in recording or reproducing operation is executed only during the High level 1 of the is recording gate signal RG or reproduction gate signal RPG, the adaptive equalization learning may be executed together with the prepit address region 61 and the tilt control in recording or reproducing operation may be executed conticuously over the information recording region 62 together with the prepit address region 61.

In addition, in the fifth embodiment, although the control operation is described with reference to the optical disk apparatus using a rewritable optical disk, i.e., RAM disk for both read and write, the leraning information may be recorded on a track for learning, reading only or any optional track in a reproducing operation of a ROM disk and the tilt control may be executed using the learning information recorded on the track when a target track to be read is reproduced. Moreover, the learning information result may be a control signal for tilt-controlling the actuator in accordance with the orthogonal shift signal.

SIXTH EMBODIMENT

Figure 18:
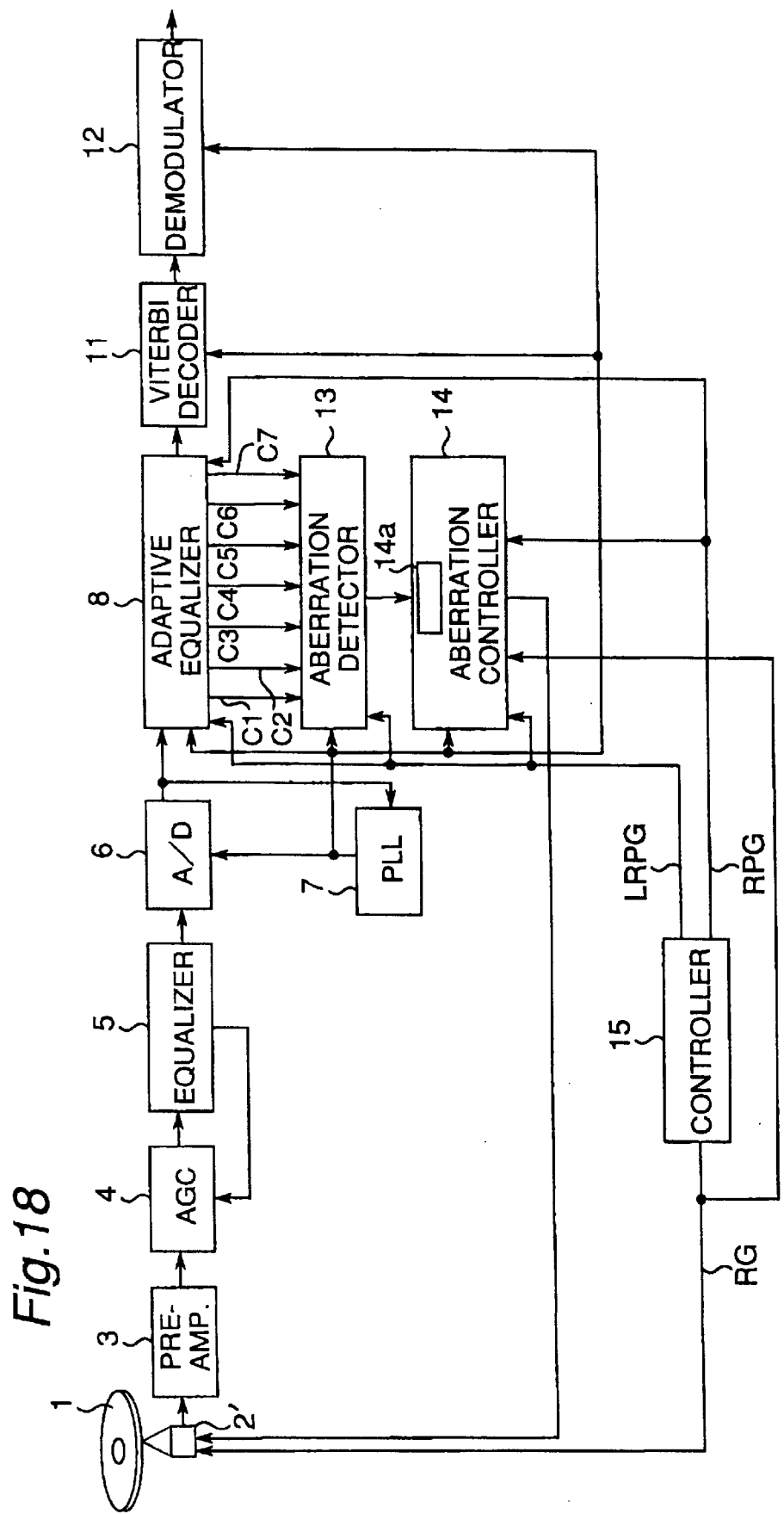
FIG. 18 is a block diagram of an optical disk apparatus according to a sixth embodiment of the present invention.

FIG. 18 shows a block construction of an optical disk apparatus according to the sixth embodiment of the present invention which is basically similar to that of the fourth embodiment shown in FIG. 16. In this sixth embodiment, the difference poin from the fourth embodiment is merely that the kind of the control gate signals output of the system controller 15 and the connecting destination thereof are changed from those of the fourth embodiment.

The following describes the control operation of the optical disk apparatus according to the sixth embodiment with reference to FIGS. 15 and 18, concentrating attention to the difference point from the fourth embodiment.

When the disk apparatus is started or immediately before the recording operation, the tracking controller controls the optical pickup to seek a track for learning the aberration control information on the optical disk. Then, the aberration control is fixed to a neutral position and the learning information is recorded to the information recording region 62 during the High level 1 of the recording gate signal RG. Next, the information recorded on the subject track for learning is reproduced while the aberration control remins to be fixed to the neutral condition, and the informationto recorded to the information recording region 62 is reproduced during the High level 1 of the learning reproduction gate signal LRPG shown in FIG. 15G. Upon receipt of the learning reproduction gate signal LRPG, the adaptive equalizer 8 executes the adaptive equalization so that the reproduction signal read out of the information recording region 62 is made optimal, and the aberration detector. 13 calculates a tap coefficient comparison of, for example, (C7–C1) of the tap coefficients of the FIR filter 21 and generates the aberration detection signal. The aberration controller 14 previously and temporarily stores the aberration detection signal for an information amount of one track in a temporary storage portion 14a in association with the position in the track tangential direction of the disk.

When the optical pickup 2' advances to track a sector to be recorded, the system controller 15 transmits the recording gate signal RG to the optical pickup 2' and in common to the aberration controller 14. During the High level 1 of the recording gate signal RG, the aberration controller 14 controls the liquid crystal tilt correction unit 2h of the optical pickup 2' in accordance with the aberration detection signal previously stored in the temporary storage portion 14a so that the aberration is made minimum by individually adjusting the light refractive indexes of the first through fourth segments of the tilt correction elements 2i, 2j, 2k and 2m. Upon receipt of the recording gate signal RG, the optical pickup 2' is controlled by the laser drive unit (LPC) shown in FIG. 19 to record the desired data signal to the disk during the High (=1) level of the recording gate signal RG.

Next, in the reading operation for reproducing data from the optical disk, when the optical pickup 2' advances to track a sector to be reproduced, the system controller 15 transmits the reproduction gate signal RPG to the adaptive equalizer 8 in common to the aberration controller 14. During the High level 1 of the reproduction gate signal RPG, the aberration controller 14 controls the liquid crystal tilt correction unit 2h of the optical pickup 2' in accordance with the aberration detection signal previously stored in the temporary storage portion 14a so that the aberration is made minimum by individually adjusting the light refractive indexes of the first through fourth segments of the tilt correction elements 2i, 2j, 2k and 2m.

Subsequently, the reproduction signal of the data information read out of the information recording region 62 is supplied to the adaptive equalizer 8 via the preamplifier 3, AGC 4, equalizer 5 and via the A/D converter 6. The adaptive equalizer 8 renews the tap coefficients and executes the adaptive equalization to the information recording region 62 so that the disk reproduction signal is made into the optimal reproduction signal, and the error due to inter-code interference remaining after conducting the aberration corection control is processed to be eliminated. Then the resultant optimal reproduction signal is applied to the Viterbi decoder 11. The Viterbi decoder 11 digitizes the input reproduction signal and the binary NRZI signal is demodulated by the demodulator 12 and the resultant reproduction data of the recovered user data format is sent out to a subsequent processing unit (not shown).

As described above, according to the sixth embodiment, even in the recording operation for recording data to the optical disk, an adaptive aberration correction control can be executed in each position of the disk track tangential direction to the disk or disk drive system having an aberration in a track tangential direction. Accordingly, when the data is recorded to the disk, the recording operation can be performed in the control condition optimally regulating the aberration. Also, in the data reproducing operation, the reproduction signal can be formed in the control condition optimally regulating the aberration. Thus, a good recording and reproducing margin can be obtained in the disk having a high recording density.

It is noted here that, as a recording track for preciously learning, a neighboring track adjacent to the subject track to be recorded may be used. Moreover, the recording track for preciously learning may be a subject track per se before subject to overwrite. The recording track for preciously learning may be a track for learning previously subjected to recording. The recording track for preciously learning may be a track adjacent to the subject track to be recorded where the track for learning has recorded the learning information immediately before the adjacent recording track is subject to recording.

In addition, in the sixth embodiment, although the adaptive equalization learning is executed only during the High level 1 of the learning reproduction gate signal LRPG and the aberration control in recording or reproducing operation is executed only during the High level 1 of the recording gate signal RG or reproduction gate signal RPG, the adaptive equalization learning may be executed together with the prepit address region 61 and the aberration control in recording or reproducing operation may be executed conticuously over the information recording region 62 together with the prepit address region 61.

In addition, in the sixth embodiment, although the control operation is described with reference to the optical disk apparatus using a rewritable optical disk, i.e., RAM disk for both read and write, the leraning information may be recorded on a track for learning, reading only or any optional track in a reproducing operation of a ROM disk and the aberration control may be executed using the learning information recorded on the track when a target track to be read is reproduced.

As described above, according to the first aspect of the present invention, even in the case where an optical disk or a drive system having an optical pickup includes a T tilt, an optimal tilt control can be executed adaptively in each position of the track tangential direction of the disk with high accuracy and a simple construction. Thus, the optimal reproduction signal can be produced in the disk reproducing system, and the disk reproduction margin can be secured even with a high recording density of the disk.

According to the second aspect of the present invention, the aberration control adaptive to each position of the disk circumferential direction can be effectively executed for the disk or drive system including the optical pickup having an aberration in the track tangential direction of the disk. Therefore, the optimal reproduction signal can be produced in the disk reproducing apparatus, and a good reproduction margin can be secured even using a disk with high recoding density.

According to the third aspect of the present invention, even in the recording operation for recording data to the optical disk, an adaptive tilt control can be executed in each position of the disk track tangential direction to the disk or disk drive system having a T tilt. Accordingly, when the data is recorded to the disk, the recording operation can be performed in the optimally T tilt controlled condition. Also, in the data reproducing operation, the reproduction signal can be made optimal. Thus, a good recording and reproducing margin can be obtained in the disk even having a high recording density. Moreover, the control learning operation is executed on the recording track, and a high accuracy of the tilt control can be obtained.

According to the fourth aspect of the present invention, even in the recording operation for recording data to the optical disk, an adaptive aberration control can be executed in each position of the disk track tangential direction to the disk or disk drive system having an aberration in a disk track tangential direction. Accordingly, when the data is recorded to the disk, the recording operation can be performed in the condition optimally correcting the aberration. Also, in the data reproducing operation, the reproduction signal can be made optimal. Thus, a good recording and reproducing margin can be obtained in the disk having a high recording density. Moreover, the control learning operation is executed on the recording track, and a high accuracy of the aberration control can be obtained.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disk apparatus for recording and reproducing information to and from an optical disk, comprising:

an optical pickup irradiating a light beam onto an optical disk surface for recording and reproducing the information to generate an analogue reproduction signal therefrom;

an A/D converter for converting the analogue reproduction signal into a digital form;

an adaptive equalizer receiving the digital reproduction signal from the A/D converter and adaptively renewing a plurality of tap coefficients of a FIR filter; and a tilt control apparatus for controlling to minimize an error of an orthogonal shift in an orthogonal relationship between an optical disk surface and an optical axis of a light beam irradiated from the optical pickup onto the optical disk, wherein the tilt control apparatus comprises:

an orthogonal shift detector for detecting the orthogonal shift of the light beam using the tap coefficients of the adaptive equalizer and generating an orthogonal shift signal in accordance with the detected orthogonal shift;

an inclination drive unit for varying the inclination of the optical axis of the light beam to correct the orthogonal shift; and a drive control unit for controlling the inclination drive of the inclination drive unit in accordance with the orhogonal shift signal to minimize the orthogonal shift of the light beam.

2. The optical disk apparatus as claimed in claim 1, wherein the orthogonal shift detector detects the orthogonal shift by comparing at least one pair of the tap coefficients symmetrical with respect to a center position in time delay order thereof.

3. The optical disk apparatus as claimed in claim 2, wherein the number of the plurality of the tap coefficients is odd in time delay order, and the drive control unit controls the inclination drive of the inclination drive unit in a manner that at least a pair of the symmetrical tap coefficients are substantially made coincident with each other.

4. The optical disk apparatus as claimed in claim 1, wherein the optical disk is a recordable and reproducable disk having a sector format including a prepit address region and an information recording region and the tilt control is executed in accordance with the orthogonal shift detected based on the tap coefficients of the FIR filter obtained by equalization learning of the reproduction signal read out of the prepit address region when the information is recorded and reproduced.

5. The optical disk apparatus as claimed in claim 4, wherein the equalization learning result of the reproduction signal read out of the prepit address region is previously obtained and stored in a storage portion when the information is recorded to the optical disk.

6. The optical disk apparatus as claimed in claim 1, wherein the orthogonal shift detected based on the tap coefficients is previously stored in a temporary storage portion and the stored orthogonal shift is used to conduct the tilt control.

7. The optical disk apparatus as claimed in claim 1, wherein the drive control unit stores the orthogonal shift detected based on the equalization learning result of the reproduction signal read out of optional one track and the stored orthogonal shift is used to conduct the tilt control.

* * * * *

UNITED STATES PATENT AND TRADEMARK OFFICE
CERTIFICATE OF CORRECTION

PATENT NO. : 6,577,568 B1
DATED : June 10, 2003
INVENTOR(S) : Shinichi Konishi et al.

It is certified that error appears in the above-identified patent and that said Letters Patent is hereby corrected as shown below:

Title page,
Item [56], References Cited, FOREIGN PATENT DOCUMENTS, change "61-51930" to -- 61-51630 --.

Column 22,
Line 6, change "orhogonal" to -- orthogonal --

Signed and Sealed this

Twenty-third Day of September, 2003

JAMES E. ROGAN
*Director of the United States Patent and Trademark Office*